United States Patent
Gossweiler, III et al.

(10) Patent No.: US 8,368,723 B1
(45) Date of Patent: Feb. 5, 2013

(54) USER INPUT COMBINATION OF TOUCH AND USER POSITION

(75) Inventors: Richard C. Gossweiler, III, Sunnyvale, CA (US); Gregory S. Corrado, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/274,045

(22) Filed: Oct. 14, 2011

Related U.S. Application Data

(60) Provisional application No. 61/507,812, filed on Jul. 14, 2011.

(51) Int. Cl.
*G09G 5/373* (2006.01)

(52) U.S. Cl. ........ 345/660; 345/428; 345/629; 345/670; 345/671; 382/113; 382/190

(58) Field of Classification Search .......... 345/428, 345/660, 629, 670, 671; 382/190, 113
See application file for complete search history.

(56) References Cited

U.S. PATENT DOCUMENTS

| | | | | |
|---|---|---|---|---|
| 7,791,668 | B2 * | 9/2010 | Maeda ............................ | 348/349 |
| 7,883,415 | B2 * | 2/2011 | Larsen et al. .................... | 463/36 |
| 2008/0238941 | A1 * | 10/2008 | Kinnan et al. ................. | 345/630 |
| 2009/0295832 | A1 * | 12/2009 | Takatsuka et al. ............. | 345/659 |
| 2010/0211397 | A1 * | 8/2010 | Park et al. ....................... | 704/276 |
| 2011/0084897 | A1 * | 4/2011 | Manoharan et al. ........... | 345/156 |
| 2011/0090303 | A1 | 4/2011 | Wu et al. | |
| 2011/0254865 | A1 * | 10/2011 | Yee et al. ........................ | 345/661 |
| 2012/0038546 | A1 * | 2/2012 | Cromer et al. ................. | 345/156 |

OTHER PUBLICATIONS

'Gadget Lab' [online]. "Apple's Next iOS Improves Interface, Adds New Gestures," Jan. 13, 2011, [retrieved on Oct. 14, 2011]. Retrieved from the internet: <URL: http://www.wired.com/gadgetlab/2011/01/apple-ios-multitouch/?pid=1238&viewall=true>.

'HotTips!' [online]. "Software Gives iPad 2 Glasses-Free 3D Viewing!," Apr. 18, 2011, [retrieved on Oct. 14, 2011]. Retrieved from the internet: <URL: http://hottipscentral.com/software-gives-ipad-2-glasses-free-3d-viewing/>.

'~jfk' [online]. 2008-2011, [retrieved on Oct. 14, 2011]. Retrieved from the internet: <URL: http://johanneskuhlmann.de/projects/facedetect>.

'MSDN Magazine' [online]. "MultiTouch Capabilities in Windows 7," Aug. 2009, [retrieved on Oct. 14, 2011]. Retrieved from the internet: <URL: http://msdn.microsoft.com/en-us/magazine/ee336016.aspx>.

(Continued)

*Primary Examiner* — Xiao M. Wu
*Assistant Examiner* — Todd Buttram
(74) *Attorney, Agent, or Firm* — Fish & Richardson P.C.

(57) ABSTRACT

In general, the subject matter described in this specification can be embodied in methods, systems, and program products. A computing system presents graphical content on a display device. The computing system determines a change in distance between a user of the computing system and a camera by tracking a visible physical feature of the user through a series of images that are captured by the camera. The computing system determines that the user has physically contacted a user input device. The computing system modifies the graphical content to change (a) a level of detail of the graphical content based on the determined change in distance between the user and the camera, and (b) boundaries of a displayed region of the graphical content based on the determined physical contact with the user input device. The computing system presents the modified graphical content for display by the display device.

24 Claims, 12 Drawing Sheets

OTHER PUBLICATIONS

'YouTube' [online]. "3D The Nokia N900 Through Head Tracking," Apr. 28, 2010, [retrieved on Oct. 14, 2011]. Retrieved from the internet: <URL: http://www.youtube.com/watch?v=yWPNNBepBUw&feature=related>.

'YouTube' [online]. "Head Tracking for iPad: Glasses-Free 3D Display," Apr. 6, 2011, [retrieved on Oct. 14, 2011]. Retrieved from the internet: <URL: http://www.youtube.com/watch?v=bBQQEcfkHoE>.

Gast, E.R. "A Framework for Real-Time Face and Facial Feature Tracking using Optical Flow Pre-estimation and Template Tracking," Master Thesis, LIACS Leiden University, Apr. 2010, 66 pages.

Gossweiler, et al., "An Introductory Tutorial for Developing Multi-User Virtual Environments," Computer Science Department—University of Virginia, 1994, 18 pages.

PalmPilot Handbook, 3Com Corporation, 1997, 202 pages.

Wang et al. "Face Tracking Using Motion-Guided Dynamic Template Matching," $5^{th}$ Asian Conference on Computer Vision—National Laboratory of Pattern Recognition, Melbourne, Australia, Jan. 25, 2002, 6 pages.

* cited by examiner

USER INPUT COMBINATION OF TOUCH AND USER POSITION

CROSS-REFERENCE TO RELATED APPLICATIONS

This application claims the benefit under 35 U.S.C. §119 (e), of U.S. Provisional Application Ser. No. 61/507,812, filed on Jul. 14, 2011, the entire contents of which is incorporated herein by reference.

TECHNICAL FIELD

This document generally relates to computer user input.

BACKGROUND

Computer systems can receive user input using various techniques. For example, a computer system that includes a touchscreen display device can recognize gestures that a user performs across the touchscreen surface and, in response, can perform associated user input actions. An example gesture and action pair includes a user swiping a single finger across a touchscreen surface in order to pan the display in the direction of the swipe. Another example gesture includes a user pinching two fingers together on the touchscreen surface in order to zoom the display outwards.

Other user input techniques use object recognition operations. For example, a computing system may track the location and movement of an object through a series of frames of a video that is captured by a digital camera connected to the computing system. In some examples, such object tracking processes are used to track the movement of a user's face. The computer system can modify a visual display based on the movement of the user's face.

SUMMARY

This document describes changing the manner in which information is displayed on a computing device in response to inputs from a user, which can include touch inputs on a touchscreen and head tracking inputs captured by a camera of the computing device.

As additional description to the implementations described below, the present disclosure describes the following implementations:

Region-Specific User Input.

Implementation 1 is directed to a computer-implemented method for receiving user input. The method includes recognizing, by a computing system, a touch input gesture that includes a first touch input in a first zone of a touchscreen that occurs simultaneous with a second touch input in a second zone of the touchscreen, the first and second zones of the touchscreen abutting a periphery of the touchscreen and having been established by the computing system as being zones for causing the computing system to react to touch input in a particular manner, in contrast to at least another zone of the touchscreen for which the computing system does not react to touch input in the particular manner. The method includes modifying, by the computing system and in response to recognizing the touch input gesture in the first and second zones, a display of the touchscreen to react in the particular manner in accordance with the touch input gesture.

Implementation 2 is directed to the method of implementation 1, wherein the first zone abuts a first edge of the touchscreen and the second zone abuts a second edge of the touchscreen that opposes the first edge of the touchscreen.

Implementation 3 is directed to the method of implementation 2, wherein the other zone separates the first zone from the second zone.

Implementation 4 is directed to the method of implementation 3, wherein: a third edge connects the first edge and the second edge; the first zone abuts a first portion of the third edge; the second zone abuts a second portion of the third edge; and the other zone abuts a third portion of the third edge, the third portion being between the first portion and the second portion.

Implementation 5 is directed to the method of any one of implementations 1-4, wherein: recognizing the touch input gesture in the zones includes determining whether the touch input gesture satisfies a criterion; and the computing system does not react to touch input in the zones in the particular manner if the touch input fails to satisfy the criterion.

Implementation 6 is directed to the method of implementation 5, wherein the criterion is not satisfied if the computing system recognizes that a third touch input with the touchscreen occurs simultaneous with the first touch input and the second touch input.

Implementation 7 is directed to the method of any one of implementations 5 through 6, wherein determining whether the touch input gesture satisfies the criterion includes identifying whether the first touch input began contact with the touchscreen inside of the first zone and the second touch input began contact with the touchscreen inside of the second zone.

Implementation 8 is directed to the method of implementation 7, wherein determining whether the touch input gesture satisfies the criterion includes identifying whether the first touch input remained inside the first zone until the first touch input ended contact with the touchscreen, and the second touch input remained inside the second zone until the second touch input ended contact with the touchscreen.

Implementation 9 is directed to the method of any one of implementations 5-8, wherein determining whether the touch input gesture satisfies the criterion includes identifying whether the first touch input moved simultaneously with the second touch input.

Implementation 10 is directed to the method of any one of implementations 5 through 9, wherein: determining whether the touch input gesture satisfies the criterion includes identifying whether the first touch input has moved a first threshold distance from a beginning location of contact of the first touch input with the touchscreen, and the second touch input has moved a second threshold distance from a beginning location of contact of the second touch input with the touchscreen; and the criterion is not satisfied if the first touch input moves less than the first threshold distance from the beginning location of the first touch input contact with the touchscreen, and if the second touch input moves less than the second threshold distance from the beginning location of the second touch input contact with the touchscreen.

Implementation 11 is directed to the method of any one of implementations 5 through 9, wherein: determining whether the touch input gesture satisfies the criterion includes identifying whether the first touch input has moved a first threshold distance over a first period of time, and the second touch input has moved a second threshold distance over a second period of time; and the criterion is not satisfied if the first touch input moves less than the first threshold distance over the first period of time, and if the second touch input moves less than the second threshold distance over the second period of time.

Implementation 12 is directed to the method of any one of implementations 5 through 11. The method further includes identifying that the first touch input moves in a first direction simultaneously as the second touch input moves in a second direction that opposes the first direction; and modifying the display of the touchscreen by changing a scale of the display by either zooming in on the display or zooming out from the display.

Implementation 13 is directed to the method of any one of implementations 5 through 11. The method further includes identifying that the first touch input moves in a third direction and the second touch input moves in the third direction; and modifying the display of the touchscreen by panning the display in the third direction.

Implementation 14 is directed to the method of any one of implementations 1 through 13. The method further includes tracking, by the computing system, movement of a feature of a user through a series of images taken by a camera; determining, by the computing system, that the feature of the user has moved in a fourth direction; and modifying, by the computing system and in response to determining that the feature of the user has moved in the fourth direction, the display of the touchscreen to react in accordance with the movement of the feature of the user.

Implementation 15 is directed to the method of implementation 14, wherein: the feature of the user is a head of the user or a part of the head of the user; modifying the display to react in accordance with the movement of the feature of the user includes zooming in on the display or away from the display as the feature of the user is determined to move towards or away from the touchscreen; and modifying the display to react in accordance to the touch input gesture includes panning the display in a direction of the touch input gesture.

Implementation 16 is directed to a system. The system includes a touchscreen display device. The system includes a computing system that includes one or more computer-readable storage devices that store instructions that, when executed by one or more processing devices of the computing system, causes the computing system to perform operations comprising: recognizing, by a computing system, a touch input gesture that includes a first touch input in a first zone of a touchscreen that occurs simultaneous with a second touch input in a second zone of the touchscreen, the first and second zones of the touchscreen abutting a periphery of the touchscreen and having been established by the computing system as being zones for causing the computing system to react to touch input in a particular manner, in contrast to at least another zone of the touchscreen for which the computing system does not react to touch input in the particular manner; and modifying, by the computing system and in response to recognizing the touch input gesture in the first and second zones, a display of the touchscreen to react in the particular manner in accordance with the touch input gesture.

Implementation 17 is directed to a computer-implemented method for receiving user input. The method includes identifying, by a computing system, that a touchscreen display has received first touch input that started in a first zone that abuts a first edge of the touchscreen and that moved in a first direction. The method includes identifying, by the computing system, that the touchscreen display has received second touch input that started in a second zone that abuts a second edge of the touchscreen and that moved in a second direction simultaneous to the movement of the first touch input, the second edge of the touchscreen opposing the first edge of the touchscreen. The method includes determining, by the computing system, that the first touch input and the second touch input satisfy criterion for invoking a user input action that modifies a display of the touchscreen in a particular manner, wherein the computing system is configured to not invoke the user input action to modify the display in the particular manner if the first touch input begins outside of the first zone or if the second touch input begins outside of the second zone. The method includes modifying, by the computing system and in response to determining that the first touch input and the second touch input satisfy the criterion for invoking the user input action, the display of the touchscreen to react in the particular manner in accordance with the user input action.

Implementation 18 is related to the method of implementation 17, wherein a third zone separates the first zone and the second zone; and the computing system is configured so that the user input action is not invoked if the first touch input contacts the third zone during movement of the touch input, or if the second touch input contacts the third zone during movement of the second touch input.

Implementation 19 is related to the method of any one of implementations 17 through 18, wherein the computing system is configured to modify the display of the touchscreen in accordance with another user input upon identifying that a third touch input begins outside of the first zone and ends in the first zone simultaneously with a fourth touch input physically contacting the touchscreen.

Implementation 20 is related to the method of any one of implementations 17 through 19. The method further includes tracking, by the computing system, movement of a head of the user or a part of the head of the user; and modifying, by the computing system and as a consequence of determining that the head of the user or the part of the head of the user has moved towards or away from the touchscreen display, the display to zoom in or out; wherein modifying the display to react in accordance to the touch input gesture includes panning the display in a direction of the touch input gesture.

Other implementations include one or more computer-readable storage devices storing instructions that, when executed by one or more processing devices, perform operations according to the above-described methods. Other implementations include systems and apparatus that include the described one or more computer-readable storage devices and that are configured to execute the operations using one or more processing devices.

User Input Combination of Touch and User Position.

Implementation 1 is directed to a computer-implemented method. The method includes presenting, by a computing system, graphical content on a display device. The method includes determining, by the computing system, a change in distance between a user of the computing system and a camera of the computing system by tracking a visible physical feature of the user through a series of images that are captured by the camera. The method includes determining, by the computing system, that the user has physically contacted a user input device of the computing system. The method includes modifying, by the computing system, the graphical content to change (a) a level of detail of the graphical content based on the determined change in distance between the user and the camera, and (b) boundaries of a displayed region of the graphical content based on the determined physical contact with the user input device. The method includes presenting, by the computing system, the modified graphical content for display by the display device.

Implementation 2 is related to the method of implementation 1, wherein the visible physical feature of the user is the user's head or a part of the user's head.

Implementation 3 is related to the method of any one of implementations 1 through 2, wherein the display device and the user input device comprise a touchscreen display device.

Implementation 4 is related to the method of implementation 3, wherein: determining that the user has physically contacted the user input device includes determining that a lateral movement of the physical contact has moved in a direction across a surface of the touchscreen display device; and modifying the boundaries of the displayed region of the graphical content includes panning the displayed region of the graphical content in the direction.

Implementation 5 is related to the method of implementation 3, wherein: determining that the user has physically contacted the user input device includes determining that a first physical user contact with the touchscreen has moved closer to a second physical user contact with the touchscreen; and modifying the boundaries of the displayed region of the graphical content includes zooming away from the displayed region so that the displayed region decreases in scale.

Implementation 6 is related to the method of any one of implementations 1 through 5, wherein modifying the graphical content to change a level of detail of the graphical content includes adding annotations to the graphical content in response to determining that the distance between the user and the camera has decreased.

Implementation 7 is related to the method of implementation 6, wherein other annotations are not removed from the graphical content as the annotations are added.

Implementation 8 is related to the method of any one of implementations 1 through 7, wherein modifying the boundaries of the displayed region of the graphical content does not account for the determined change in distance between the user and the camera.

Implementation 9 is related to the method of any one of implementations 1 through 8, wherein: the graphical content includes a map that shows geographical features of the world, modifying the level of detail includes adding annotations to the map, the annotations selected from a group consisting of street names and business names, and modifying the boundaries of the displayed region of the graphical content includes changing a region of the map that is displayed by the display device in response to determining that the user physically contacted the user input device.

Implementation 10 is related to the method of any one of implementations 1 through 8, wherein: the graphical content includes a display of an object that the computing system presents for display as being currently displayed content from among a set of objects; modifying the level of detail includes adding annotations to the display of the object that is the currently displayed content as the distance between the user and the camera is determined to decrease; and modifying the boundaries of the displayed region of the graphical content includes changing the currently displayed content from the object that has is the currently displayed content to a different object in response to determining that the user physically contact the user input device.

Implementation 11 is related to the method of any one of implementations 1 through 10, wherein: the physical contact and the change in distance between the user and the camera are determined to occur simultaneously; and presenting the modified graphical content includes presenting the modified graphical content during the simultaneous physical contact and the change in distance.

Implementation 12 is directed to a computer-implemented method. The method includes presenting, by a computing system and on a touchscreen, a display of a region of a map that shows geographical features of the world. The method includes determining, by the computing system, a change in distance between a user of the computing system and a camera of the computing system by tracking a visible physical feature of the user through a series of images that are captured by the camera. The method includes recognizing, by the computing system, touch input with a surface of the touchscreen. The method includes modifying, by the computing system, the map to change (a) a level of detail of the map based on the change in distance between the user and the camera, and (b) boundaries of the presented region of the map based on the recognized touch input. The method includes presenting, by the computing system, the modified map for display by the display device.

Implementation 13 is related to the method of implementation 12, wherein changing the level of detail of the map based on the change in distance between the user and the camera includes adding street name annotations to the map.

Implementation 14 is related to the method of implementation 12, wherein changing the level of detail of the map based on the change in distance between the user and the camera includes at least partially transforming the map from showing a photographical image of an associated geographical area to showing a road map that illustrates roads of the associated geographical area.

Implementation 15 is related to the method of implementation 12, wherein changing the level of detail of the map based on the change in distance between the user and the camera includes at least partially transforming the map from showing a two-dimensional representation of an associated geographical area to showing a three-dimensional representation of the associated geographical area.

Implementation 16 is related to the method of implementation 15. The method further includes determining, by the computing system, a change in location of the user with respect to the camera by tracking the visible physical feature of the user, and in response, changing a displayed point of view of the three-dimensional representation of the associated geographical area.

Implementation 17 is directed to a computerized system. The system includes a touchscreen for displaying graphical content. The system includes a camera arranged to capture images. The system includes a first computing subsystem that is configured to identify touch input with the touchscreen display device and, in response, to modify boundaries of a region of the graphical content that is displayed by the touchscreen. The system includes a second computing subsystem that is configured to identify a change in distance between a feature of a user and the camera and, in response, to modify a level of detail of the graphical content that is displayed by the touchscreen.

Implementation 18 is related to the system of implementation 17, wherein the first computing subsystem is configured to pan the region of the graphical content that is displayed on the touchscreen in a first direction in response to the touch input performing a lateral movement across the touchscreen in the first direction.

Implementation 19 is related to the system of any one of implementations 17 through 18, wherein the first computing subsystem is configured to zoom into the graphical content that is displayed on the touchscreen so as to display the graphical content at a greater scale in response to the touch input including a first touch input and a second touch input that are performing as lateral movements across the touchscreen away from each other.

Implementation 20 is related to the system of any one of implementations 17 through 19, wherein the second computing subsystem is configured to increase the level of detail of the graphical content in response to the distance decreasing, and to decrease the level of detail of the graphical content in response to the distance increasing.

Implementation 21 is related to the system of any one of implementations 17 through 20, wherein the second computing subsystem is configured to maintain the displayed region of graphical content without a change in boundaries as the level of detail is increased or decreased in response to the change in distance.

Other implementations include one or more computer-readable storage devices storing instructions that, when executed by one or more processing devices, perform operations according to the above-described methods. Other implementations include systems and apparatus that include the described one or more computer-readable storage devices and that are configured to execute the operations using one or more processing devices.

Opposing User Inputs.

Implementation 1 is directed to a computer-implemented method. The method includes presenting, by a computing system, a region of graphical content for display by a display device. The method includes determining, by the computing system, a first level to which a user manipulated an orientation of the computing system using an orientation sensor of the computing system, the manipulation of the orientation of the computing system causing a position of a visible physical feature of the user relative to the computing system to change in a defined manner. The method includes determining, by the computing system, a second level to which the user physically changed a location of the visible physical feature of the user by tracking the visible physical feature of the user through a series of images that are taken by a camera of the computing system, the physical change in location of the visible physical feature causing the position of the visible physical feature of the user relative to the computing system to change in the defined manner. The method includes modifying, by the computing system, the region of graphical content that is for display by the display device to pan in either a first direction or a second direction that opposes the first direction by using (a) the first level to influence panning in the first direction and (b) the second level to influence panning in the second direction. The method includes presenting, by the computing system, the modified region of graphical content for display by the display device.

Implementation 2 is related to the method of implementation 1, wherein determining the second level to which the user physically changed the location of the visible physical feature of the user includes identifying a change in location of the visible physical feature through the tracked series of images and reducing the identified change in location based on the determined first level to which the user manipulated the orientation of the computing system.

Implementation 3 is related to the method of any one of implementations 1 through 2, wherein the first level is associated with a velocity for which the region of the graphical content is to pan.

Implementation 4 is related to the method of any one of implementations 1 through 3, wherein the second level is associated with a position to which the region of the graphical content is to pan.

Implementation 5 is related to the method of any one of implementations 1 through 4, wherein modifying the region of graphical content includes applying a value that represents the second level against a value that represents the first level in order to counteract panning in the first direction.

Implementation 6 is related to the method of any one of implementations 1 through 5, wherein the defined manner includes the visible physical feature of the user moving at least partially sideways in the images that are taken by the camera.

Implementation 7 is related to the method of any one of implementations 1 through 6, wherein the graphical content includes a map that shows geographical features of the world.

Other implementations include one or more computer-readable storage devices storing instructions that, when executed by one or more processing devices, perform operations according to the above-described methods. Other implementations include systems and apparatus that include the described one or more computer-readable storage devices and that are configured to execute the operations using one or more processing devices.

Particular implementations can, in certain instances, realize one or more of the following advantages. The user input mechanisms described in this disclosure can enable a user to use his thumbs to provide touch user input to a mobile computing device while the user continues to grip the computing device securely. The user may not have to release his grip from the computing device with one or both hands. Because the user input is recognized on the display, instead of with physical buttons, the touchscreen may cover an increased amount of a face of the computing device. As such, a display of information may be increased.

Further, a user may cause the computing device to display more or less detail for a region of displayed graphical content, while maintaining boundaries of the region, by moving his head towards or away from the computing device's camera. As such, a user may have more control, and more intuitive control, over the information that is presented on the display. For example, as a user "looks in" to better view a display, the content on the display may be zoomed into or otherwise clarified to help the user see the content better.

The details of one or more implementations are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

This document generally describes techniques for a computing system to receive user input.

Figure 1:
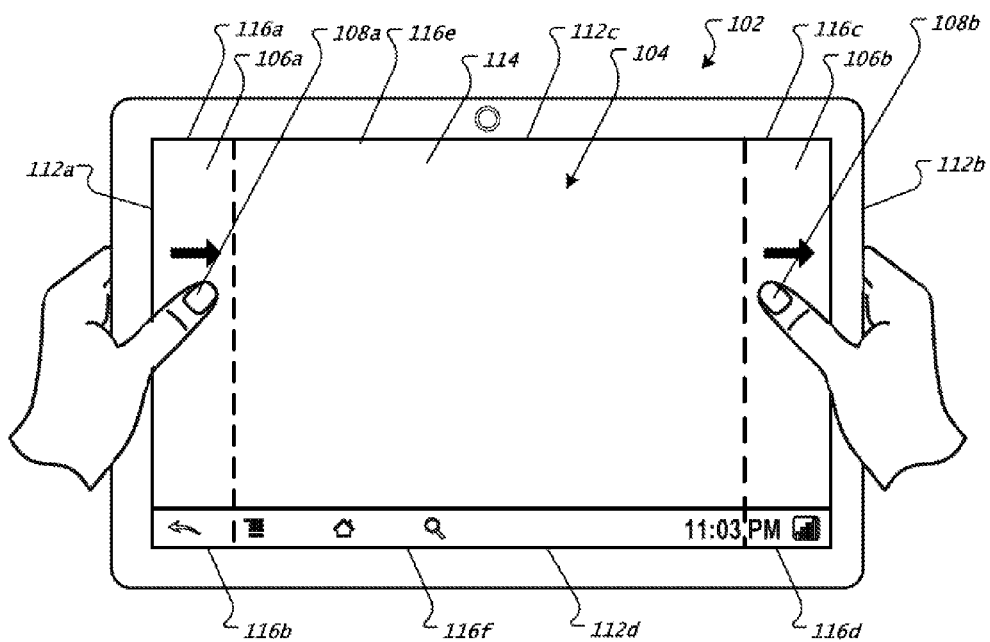
FIG. 1 shows a user providing touch input in zones of a touchscreen display device.

FIG. 1 shows a user providing touch input in zones of a touchscreen display device. In general, the computing device 102 can recognize touch input gestures (herein touch input gestures) that are performed in zones 106a-b of a touchscreen display device 104 that the computing device 102 may not recognize outside of the zones 106a-b.

For example, one type of touch input gesture includes a user moving his left thumb 108a rightward while contacting the touchscreen 104 inside of the zone 106a simultaneously as the user moves his right thumb 108b rightward while contacting the touchscreen 104 inside the zone 106b. (Simultaneity involves performance of the operations overlapping in time, but does not require the operations to start and/or end simultaneously.) In response to the computing system recognizing such a user input gesture, the computing system performs an associated user input action, for example, causing a web browser to switch tabs.

The computing system may be configured to not perform the same user input action if the user provides the same type of touch input gesture outside of zones 106a-b. For example, the web browser may not display a different tab if one or both of the thumbs 108a-b performs the simultaneous rightward swipe while contacting the touchscreen partially or fully outside of the zones 106a-b. When touch inputs are provided in such other areas, different actions of the computing device 102 may result, such as scrolling of content in the contacted area, selection of text in the contacted area, and the like.

In some examples, touch input (herein touch input) may have to satisfy criterion, in addition to being performed within the zones 106a-b, in order for the computing system to recognize the touch input as a gesture and perform the corresponding action. For example, both of the thumbs 108a-b may have to swipe across the touchscreen 104 simultaneously. In another example, the thumbs 108a-b may have to each swipe a threshold distance or with a threshold velocity. Criteria for recognizing user input gestures in the zones 106a-b are described with greater detail below.

More particularly, the computing system 102 recognizes that zones 106a-b are capable of receiving touch input that can be recognized as particular gestures so as to invoke corresponding actions. The zones 106a-b may abut a periphery of the touchscreen. The periphery includes four edges 112a-d that each occupy an edge of the touchscreen. A first edge 112a opposes a second edge 112b. The first edge 112a is connected to the second edge 112b by a third edge 112c and a fourth edge 112d. The first zone 112a is separated from the second zone 112b by a middle zone 114.

In this example, the first zone 112a abuts the entire first edge 112a and portions 116a-b of the third edge 112c and the fourth edge 112d, respectively. "Abut" is defined herein as bordering an edge (i.e., the zone recognizes user touch contact up to the edge), or as substantially bordering the edge (i.e., the zone recognizes user touch contact to up to 1 cm from the edge or less). Likewise, the second zone 112b abuts the entire second edge 112b and portions 116c-d of the third edge 112c and the fourth edge 112d, respectively. The middle zone 114 abuts portions 116e-f of the third edge 112c and the fourth edge 112d, respectively. In this example, the middle zone 114 completely separates the first zone 106a from the second zone 106b because the first zone 106a does not contact the second zone 106b.

In some examples, the computing system 102 may not visually depict indications of the first zone 106a and the second zone 106b to the user. In some examples, the computing device 102 may visually depict indications of the first zone 106a and the second zone 106b to the user. An example scenario includes the user physically contacting both zones 106a-b simultaneously. Upon the user performing such action, the zones 106a-b may change in appearance so that a user may distinguish the zones 106a-b from other portions of the display. For example, the zones may not be visually depicted as differing from adjacent zones until the user input begins, and may then be changed (e.g., by being outlined in a color that contrasts with a background color) once the user input process begins. The zones 106a-b may remain changed in appearance for a timed delay or until the user removes one or both of his thumbs 108a-b from the zones 106a-b. The zones 106a-b may change in appearance by changing in contrast, color, pattern, or border.

Figure 2:
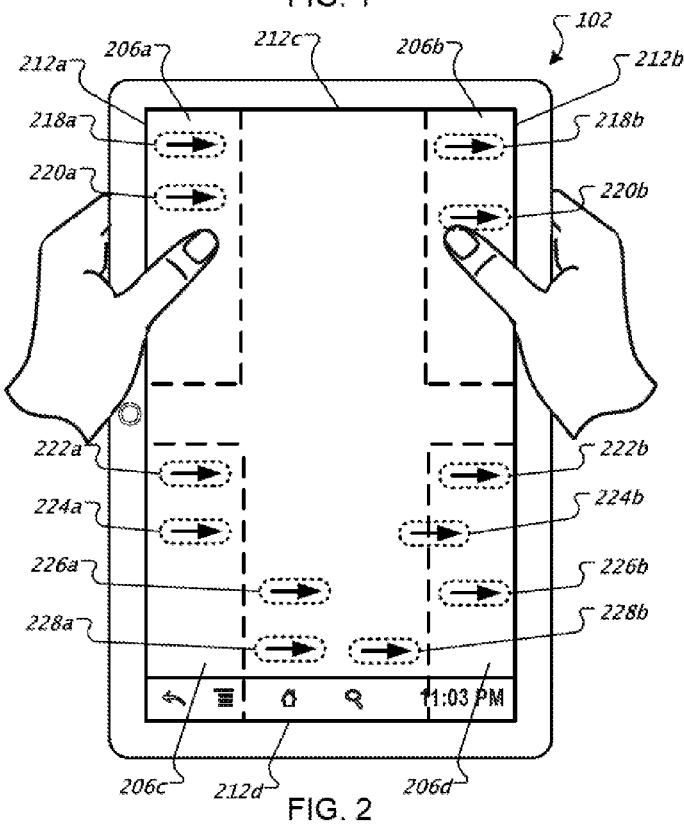
FIG. 2 shows various combinations of touch input that a user can provide on a touchscreen display device.

FIG. 2 shows various combinations of touch input that a user can provide on a touchscreen display device. In this example, the user has rotated the computing system 102 from a landscape orientation to a portrait orientation. The computing system 102 may recognize that the device 102 has been rotated, for example, using one or more orientation determining devices (e.g., accelerometers or gyroscopes) of the computing system 102. In response, the computing system 102 may recognize different zones 206a-d as being capable of accepting zone-specific touch input gestures than when the computing system is held by the user in landscape orientation. For example, zones 106a-b may only exist in landscape orientation, and not in portrait orientation.

In this example, the computing system 102 recognizes a pair of top zones 206a-b and a pair of bottom zones 206c-d. A type of touch input gesture that occurs using two fingers in the top zones 206a-b may cause the computing system 102 to perform a user input action that is different than a user input action that is performed if the same type of touch input gesture is performed in the bottom zones 206c-d. As such, the computing system may increase an amount of gestures that a user can provide when the user's hands are holding the edges of the computing system.

In some examples, however, the computing system 102 may recognize the same type of touch input gesture as occurring regardless of the position of touch inputs within a zone. For example, the simultaneous touch inputs that are illustrated by bubbles 218a-b may invoke the same user input action as when the user provides the simultaneous touch inputs that are illustrated by bubbles 220a-b, even though the bubbles 220a-b appear lower in the zones 206a-b. Further, bubble 220a is somewhat vertically offset from bubble 220b. In some examples, the touch inputs that are illustrated by bubbles 220a-b have to be determined to be within a threshold vertical distance (i.e., a distance along an axis that tangentially connects the top edge 212c to the bottom edge 212d) of each other in order for the computing system to recognize an appropriate touch input gesture.

Each bubble that is shown in FIG. 2 may illustrate a touch input of a user's single finger. The beginning of the arrow in the bubble generally represents a location of a beginning of physical contact between the user's finger and the touchscreen. The end of the arrow generally represents an end of the physical contact between the user's finger and the touchscreen. The user's finger may remain in physical contact with the touchscreen between the beginning of the physical contact and the end of the physical contact.

The touch input gestures that the computing system may recognize in zones 206a-d may not be recognized should the same gestures occur at least partially outside of zones 206a-d. As an illustration, the computing system may perform a particular user input action upon recognizing that a user input gesture identified by bubbles 222a-b occurs within the zones 206c-d. In contrast, the computing system may not perform the particular user input action upon identifying the touch inputs of bubbles 224a-b, because the touch input identified by bubble 224b began physical contact with the touchscreen outside of the zone 206d.

Similarly, the computing system may not perform the particular user input action upon identifying the touch inputs of bubbles 226a-b, because the touch input identified by bubble 226a occurred completely outside of the zone 206c. Moreover, the computing system may not perform the particular user input action upon identifying the touch inputs of bubbles 228a-b, because the touch inputs of bubbles 228a-b occurred completely outside of the zones 206c-d. In various examples, however, the computing system may perform the particular user input action so long as the touch inputs start within the zones 206c-d, or occur at least partially inside of the zones 206c-d (e.g., as represented by the bubbles 224a-b).

In some examples, each bubble shown in FIG. 2 represents the region contacted by the user's finger. In other words, in some examples, a touch input may remain inside of a zone as long as the entire region of the finger contacting the touch screen remains inside of the zone. In some examples, the bubble represents the movement of a determined center of the user's finger. In other words, a touch input may remain inside of a zone so long as the determined center of the user's finger remains inside of the zone.

In some examples, the computing system may not perform any user input action when a user input gesture—which would cause an action if occurring inside of the zones 206c-d—is not recognized as occurring within the zones 206c-d. In some examples, the computing system may perform a different user input action when a user input gesture, which would cause a particular type of action if occurring inside of the zones 206 c-d, is not recognized as occurring within the zones 206c-d.

As an illustration, the computing system may be configured so that two simultaneous swipes to the right within zones 106a-b (as illustrated by FIG. 1) cause the computing system to switch from a mapping application program to a different application program that is minimized. The mapping application program may display content across most or all of the touchscreen display. As such, the computing system may be configured to recognize user multi-touch input across most or all of the touchscreen display, as long as the user multi-touch input does not satisfy the criteria for the user input gesture that is associated with the zones 106a-b. In other words, the zones 106a-b may cover a portion of the display which receives certain types of user input. User input in the zones 106a-b, however, may only be recognized if the user input satisfies special characteristics (e.g., being simultaneous with another touch input in another zone).

As a further example, the user input gesture identified by any of the bubbles 224a-b, 226a-b, or 228a-b may pan the display to the right instead of switching application programs. As discussed in greater detail below, a user input gesture can include touch inputs that move towards or away from each other. Such user input gestures may cause the computing system to perform a particular action when occurring within designated zones. The computing system may perform a different user action if such user input gestures are performed along paths shown by the bubbles 224a-b, 226a-b, or 228a-b (assuming that the arrows in the regions showed the touch inputs moving towards or away from each other). As such, most or all of the display may be available for recognizing particular types of user input gestures. Special reserved user input gestures may be recognized upon satisfaction of criterion that are described in detail throughout this disclosure, for example, that the touch inputs occur simultaneously within designated zones and with a determined velocity.

In various examples, an operating system of the computing system may be configured to recognize user input gestures and provide indications of recognized user input gestures to an application program that has the focus of the computing device (e.g., an application program that a user has launched and that fills the computing system display to the exception of graphical interface elements that are components of the operating system user interface). The focused application program may be associated with settings that request particular user input gestures for the operating system to recognize and indicate to the focused application program.

As an illustration, the above-described mapping application program may register with the operating system that it would like to receive indications of pinch and zoom multi-touch gestures and panning single-touch gestures across a region of the display that the application program designates. In some examples, the mapping application program also registers with the operating system that it would like to receive indications of user input gestures that are associated with zones 106a-b. In some examples, the user input gestures that are associated with zones 106a-b are system-level user input gestures that execute system-level user input actions (e.g., switching between application programs, minimizing an application program, and acting as a shortcut to launch a designated application program).

Figure 3:
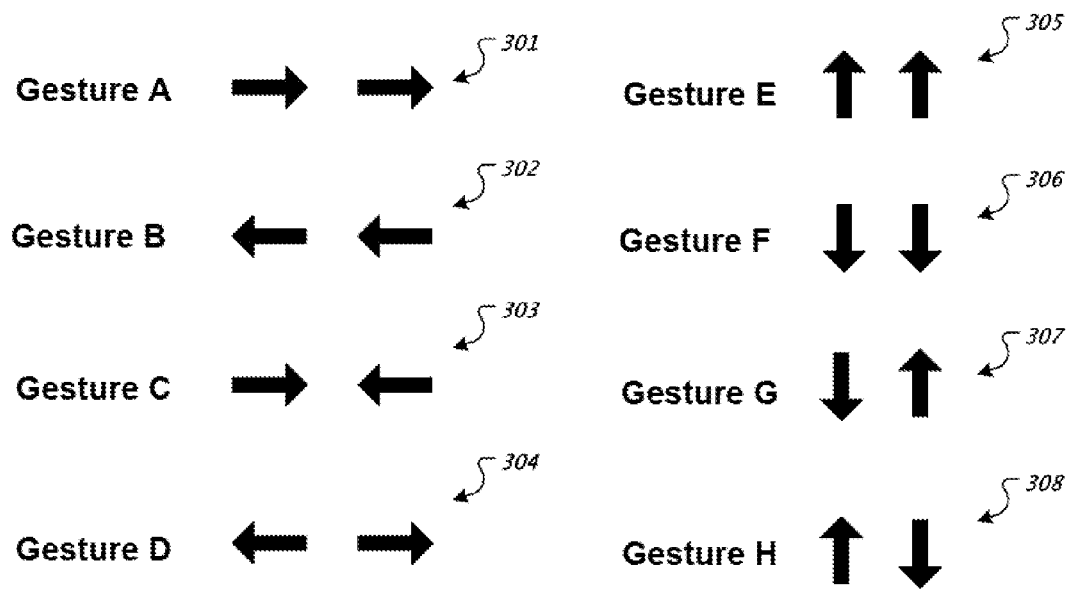
FIG. 3 shows multiple touch input gestures.

FIG. 3 shows multiple touch input gestures. One or more of the illustrated gestures may be performed by a user within the zones 106a-b, 206a-b, or 206c-d in order to cause the computing system to perform associated user input actions. Although FIGS. 1 and 2 show gesture A 301 in various positions, the figures and the accompanying description further apply to gestures B 302 through H 308. In FIG. 3, the left arrow represents a touch input in left zone 106a and the right arrow represents a touch input in right zone 106b.

The computing system may recognize various combinations of one or more of the gestures 301-308. In response, the computing system may perform corresponding user input actions. For example, gesture A 301 may cause the computing system to pan a display to the right, gesture B 302 may cause the computing system to pan the display to the left, gesture C 303 may cause the computing system to zoom away from the display, gesture D 304 may cause the computing system to zoom into the display, gesture E 305 may cause the computing system to pan the display upwards, gesture F 306 may cause the computing system to pan the display downwards, gesture G 307 may cause the computing system to rotate the display counter-clockwise, and gesture H 308 may cause the computing system to rotate the display clockwise.

Other user input actions may be performed upon recognizing any of the gestures 301-308. For example, "rightward" gesture A 301 may cause the computing device to switch to another tab in a web browser, switch to a next media file in a playlist of media files, perform the "redo" function in a word processor, cause a web browser to navigate forward to a next web page, or cause a display of objects (e.g., pictures or contact records) to navigate to display a next object. Similarly, "leftward" gesture B 302 may cause the computing device to switch to a tab in a web browser in a different direction, switch to a last media file in a playlist of media files, perform the "undo" function in a word processor, cause a web browser to navigate backwards to a previous web page, or cause a display of objects to navigate to a previous object.

Any of the user input actions described throughout this document may be associated with any of the gestures 301-308, in any appropriate combination. Further, shortcuts to launch application programs or perform other operations may be associated with any of the gestures 301-308, as appropriate. For example, the "clockwise" user input action H 308 may cause the computing system to launch a "telephone" application program.

In some examples, a computing system recognizes a touch input gesture that includes a simultaneous tap of a finger from each hand within zones 106a-b, or a simultaneous double tap of the fingers within zones 106a-b (e.g., each thumb taps two times). Either of the single or double-tap user input gestures may cause the computing system select an object, pause a media file, refresh a web page, or display a menu of options for the user to select, for example.

In some examples, a user input gesture includes a single touch input occurring within a single zone (e.g., zone 106a). The zone may abut an edge of the touchscreen so that a user can supply user input while holding the computing system 102 in a secure manner (as illustrated in FIG. 1). The single touch input may include a single tap, a double tap, a long-press, or swipes in various directions. The single touch input may have to satisfy any combination of one or more of the criteria that are described throughout this disclosure. Any of these single touch input gestures may cause the computing system to perform any of the user input actions that are described throughout this disclosure.

Figure 4:
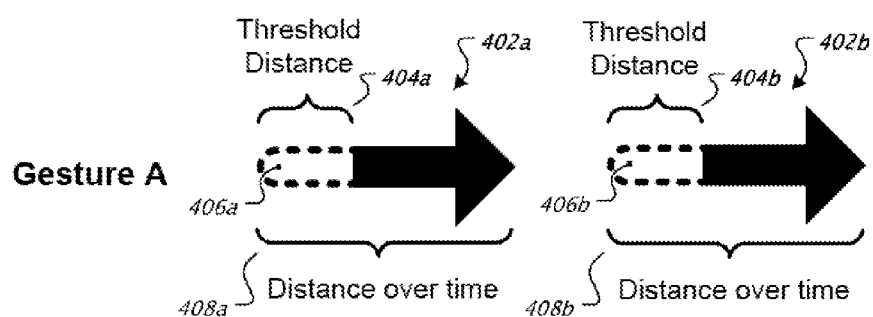
FIG. 4 illustrates criteria that may be satisfied in order for the computing system to recognize a user input gesture.

FIG. 4 illustrates criteria that may be satisfied in order for the computing system to recognize a user input gesture. In various examples, the user input zones (e.g., zones 106a-b) recognize fine touch input movement. For example, a user may perform a delicate gesture by placing his thumbs in the zones 106a-b and slightly moving one thumb away from the other by 0.2 cm. In response, the computing system may cause the display to zoom inwards (e.g., by zooming larger). Similarly, should the user pan both thumbs to the left and slightly upwards by 0.1 cm, the display may move to the left and slightly upwards by a small amount.

In some examples, however, the touch input may have to satisfy one or more of criteria regarding distance or velocity in order for the computing system to recognize a user input gesture. More specifically, such criteria include the user having to swipe his fingers a certain distance across the display or with a certain velocity. Such criteria are described with reference to FIG. 4, which illustrates two touch inputs 402a-b.

One criterion includes the computing system having to recognize that one or both of the touch inputs 402a-b of a gesture move a threshold distance 404a-b from beginning location 406a-b. If one or more of the touch inputs 402a-b do not move the threshold distance 404a-b, then the computing system may not recognize the touch input gesture 301. The beginning locations 406a-b may include a location of initial physical contact between a user's finger and the touchscreen, or a position at which the user has rested his fingers for a determined amount of time without moving more than a particular distance.

Another criterion includes the computing system having to recognize that the touch inputs 402a-b moved a distance 408a-b within a determined period of time. In other words, the touch inputs 402a-b may have to exceed an average velocity over a period of time. In some examples, the average velocity is calculated using a sliding window that determines the average velocity of a touch input over the last "N" data points (e.g., the data points may represent touch input locations that were collected over the last 0.2 seconds).

Figure 5:
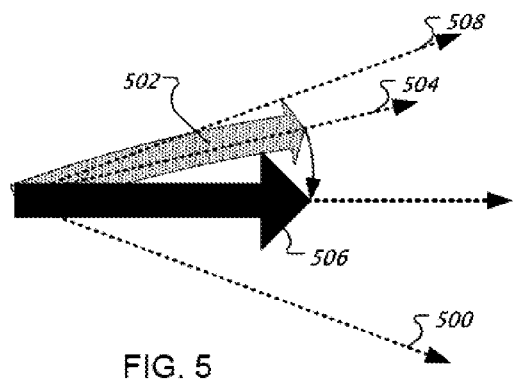
FIG. 5 illustrates a touch input and a system recognized version of the touch input.

FIG. 5 illustrates a touch input and a system recognized version of the touch input. In this example, a user has provided input 502 to the computing system by contacting a touchscreen of the computing system along a path that is illustrated by input 502. In some examples, however, the computing system may recognize touch input gestures 301-308 that correspond to particular recognized orientations (e.g., the orthogonal directions up, down, left, and right). As such, the computing system may determine an orientation of the input 502 that is most similar to a recognized orientation. For example, the computing system may determine that the input 502, while slightly curved, trends along an axis 504 between the starting location and ending location of the input 502.

The computing system may recognize the user as having provided the touch input 506, should a touch input trend along an axis that falls within a range of axes 508 and 500. Input that trends along an axis that falls outside of axes 508 and 500 may not be recognized as touch input 506. Rather, the input may not be recognized by the computing system for purposes of generating a gesture 301-308, or may be recognized by the computing system as providing a different touch input (e.g., an "up" touch input).

References in this disclosure to touch inputs that are aligned in specific directions (e.g., the touch inputs of gestures 301-308) may be understood to be "system recognized" touch inputs, as described above. In other words, the general inability of human users to swipe across a touchscreen in a perfectly straight line and in a perfectly orthogonal manner leads the systems described herein to determine a user's "closest attempt."

Figure 6:
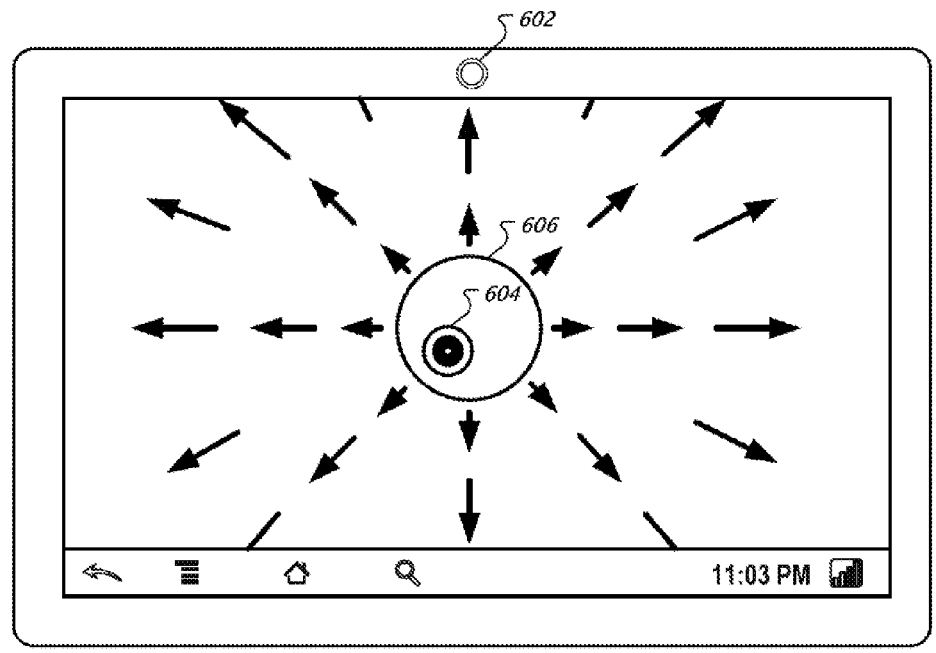
FIG. 6 illustrates user input that is based on tracking a feature of a user with a camera.

FIG. 6 illustrates user input that is based on tracking a feature of a user with a camera. For example, the computing system causes camera 602 to occasionally capture an image. The computing system can determine a location of a feature of the user in the captured image, and can track a change in the location of the feature in a subsequent image in order to determine movement of the feature. The feature can be any combination of one or more of the user's head, face, eyes, nose, ears, mouth, and hand. The feature of the user may be referred to throughout this disclosure as being the user's head for illustrative purposes, although the computing system can track other features of the user.

The disc 604 generally indicates a position of the user's head with respect to the camera. As the user moves his head to the left, the disc 604 may move to the left. As the user moves his head upwards, the disc 604 may move upwards. The disc 604 may represent the location that is in front of the user's head on the touchscreen (e.g., so that if the user moved his head forward, his nose may touch the disc 604), or may represent the general location of the user's head with respect to the touchscreen (e.g., the user may move his head to the left of the touchscreen, but the disc 604 may lag behind and display on the touchscreen). The disc 604 is shown for illustrative purposes, and may not be displayed to the user on the touchscreen.

The computing system may use the position of the user's head to modify a display that is presented to the user. For example, the position of the user's head may be used to pan across a display of a map or a web page. The computing system may not pan the display should the disc 604 (also referred to herein as the location of the user's head) remain within the "no-fly" zone 606. Once the disc leaves the no-fly zone 606, the device may pan in a direction that corresponds to the location of the user's head with respect to the no-fly zone. For example, if the user moves his head down and to the right, the display may pan down and to the right.

Movement of the user's head may cause absolute panning or relative panning. With absolute panning, the display may pan as the user moves his head outside of the no-fly zone 606, but if the user stops moving his head while outside of the no-fly zone 606, the display may no longer pan. As such, the display tracks the movement of the user's head and the display may re-center on the originally presented region of the display should the user return his head to the no-fly zone 606. In other words, the display may be "pinned" to some extent to the location of the user's head. Absolute panning may be valuable for small refinements to point of view or panning.

Figure 7:
FIG. 7 shows a velocity curve.

With relative panning, the computing system may pan in a direction of the user's head with respect to the non-fly zone 606, and the speed of the panning may be based on the distance that the user's head is from the no-fly zone 606. For example, should the user move his head just to the left of the no-fly zone 606, the display may pan to the left at a slow rate (e.g., 1 cm of display a second). Should the user move his head further to the left of the no-fly zone 606, the display may pan to the left at a faster rate (e.g., 5 cm of display a second). This change in rate of panning is illustrated by the velocity curve 702 of FIG. 7. As the distance of the user's head from the no-fly zone increases, the velocity at which the display pans also increases. In some examples, the computing system does not include a no-fly zone and the absolute or relative panning is determined based on the distance of the user's head from a determined center location. In some examples, the velocity curve 702 is straight near the bottom of the curve so that the panning linearly increases in velocity as the user moves his head out of the no-fly zone. A top part of the velocity curve 702 may be curved in shape such that, as the user moves his head further away from the no-fly zone, the increase in velocity accelerates with the change in location of the user's head.

In some examples, the computing system pans the display based on the position of a user's thumbs in the zones 106a-b, similar to the described mechanism for panning based on position of the user's head. For example, if the user moves both his thumbs from the middle of zones 106a-b to the right side of zones 106a-b, the display may start to pan to the right until the user either lifts one or more of his thumbs or moves his thumbs back to the middle of the zones 106a-b. A velocity at which the display pans may depend on how close to the edge of the zones 106a-b the user has moved his thumbs and how long the user has had his thumbs placed there. The user may pan to the left, up, or down in a similar manner.

Figure 8A:
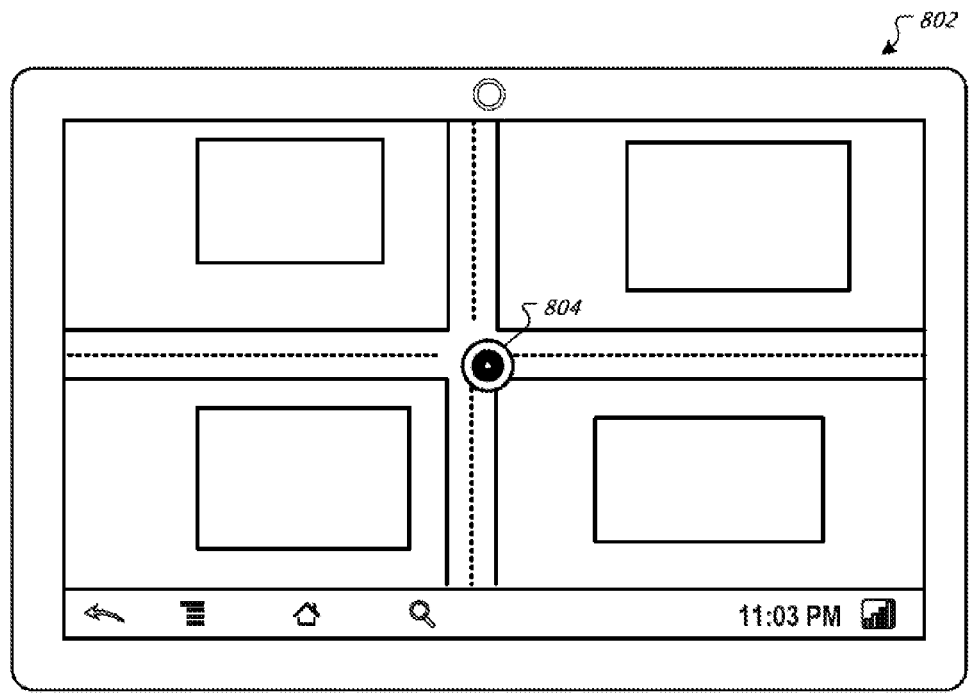
FIGS. 8A-B illustrate user input based on tracking a feature of a user with a camera that causes the computing system to move at least part of the display in a direction of the feature.
Figure 8B:
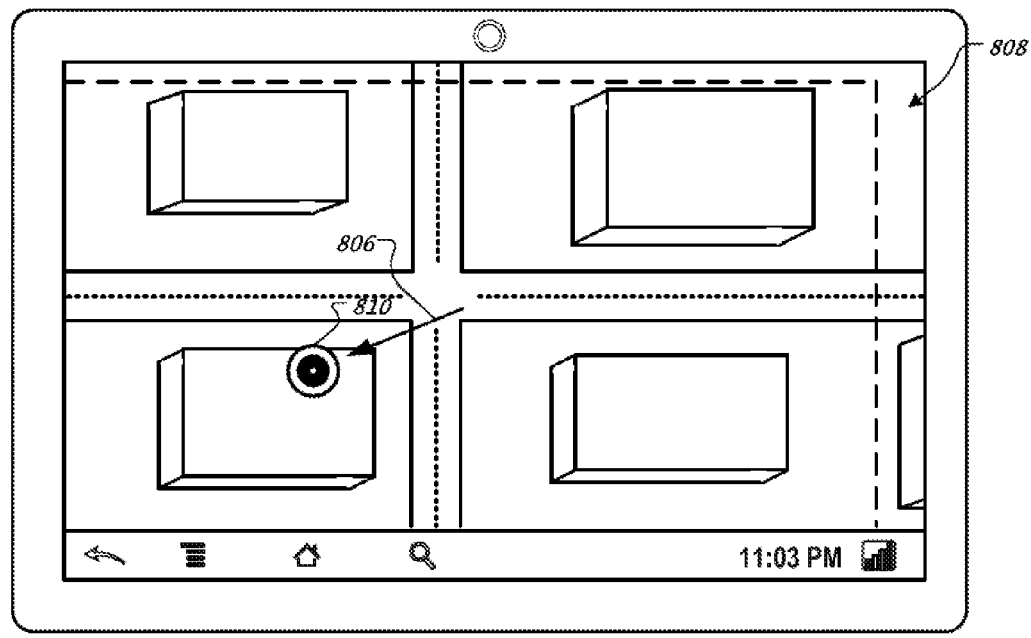

FIGS. 8A-B illustrate user input based on tracking a feature of a user with a camera that causes the computing system to move at least part of the display in a direction of the feature. For example, a user of a handheld computing system 802 may move his head (as represented by disc 804) in a first direction 806 while the user is viewing a mapping application program. In response, the computing system may introduce a new region 808 of the map (e.g., new map "tiles") at one or more edges of the display that oppose the direction 806 in which the user moved his head.

In contrast, the region of the map in the direction to which the user moved his head may move off the display in a panning operation or may shrink in scale as the map makes room for the new region 808a. As illustrated in FIGS. 8A-C, the computing system may use such head-tracking user input techniques when the mapping application program is configured to display objects in three-dimensions. For example, should the user move his head in the first direction 806, the user may be trying to view "into" and "around" the right- and top-most edges of the touchscreen. The new mapping display region 808 may be introduced into the top and right sides of the display to provide such an effect.

Figure 9:
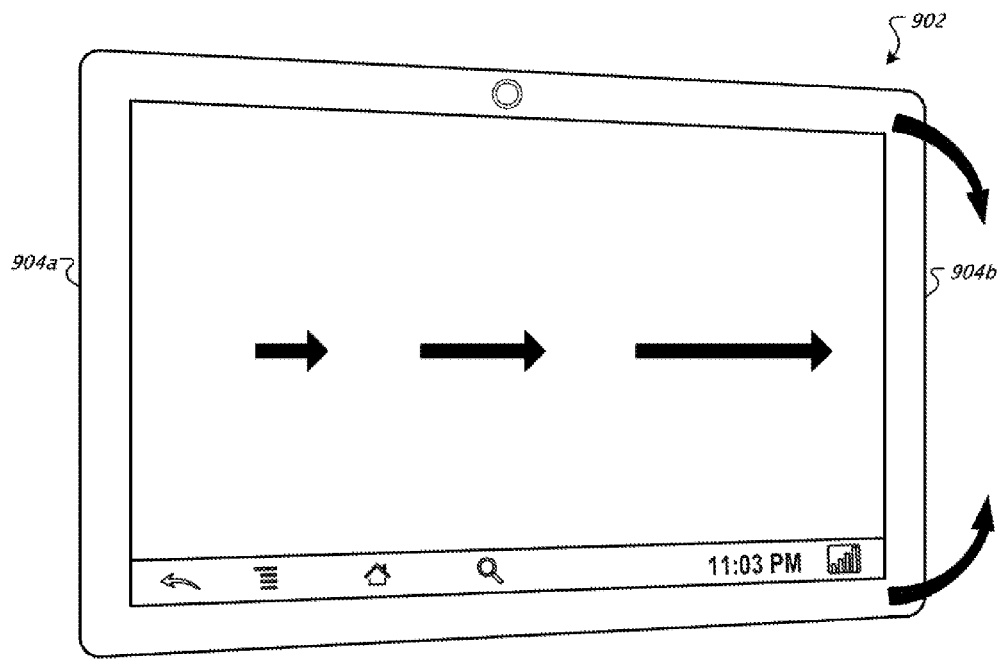
FIG. 9 illustrates user input by physical manipulation of a computing system that causes the computing system to pan a display.

FIG. 9 illustrates user input by physical manipulation of a computing system 902 that causes the computing system to pan a display. As an illustration, suppose that a user is holding the system 902 with the user's left hand on a left edge 904a of the system 902 and the user's right hand on a right edge 904b of the system 902. The user may move his right hand outward from his body in order for the display to pan toward the edge that the user moved outward from his body (in this instance the display pans to the right). In other words, the display may "pour" off of the edge that the user has pushed away from his body.

The computing system may recognize such movement of the system using an orientation device in the system 902 (e.g., one or more accelerometers or gyroscopes). In some examples, the rate at which the display moves toward the edge that the user has pushed outward is based on the distance that the pushed-out edge is from the user's body with respect to a non-pushed-out edge (i.e., the left edge in this illustration). In other words, should the user push the right edge away from an even orientation by 5 cm, the display may pan to the right at a rate of 1 cm a second. Should the user push the right edge away from the user by 10 cm, the display may pan to the right at a rate of 5 cm a second. The above-described operations may apply to movements of the device in directions toward other edges or combination of edges.

In both of the scenarios described with reference to FIGS. 8A-B and 9 (i.e., the scenarios where the user moves his head to the left or the user pushes the right side of the system outward), the user's head moves to the right in images that are captured by the front-facing camera of the computing system. Still, the display moves in different directions based on the same type of head movement in the image. When the user moves his head to the left to peer into and around the edges of the display, the display sweeps to the left. When the user tilts the device to the right to pan the display, the display sweeps to the right.

As such, the computing system may not use head tracking to recognize both types of user input. Accordingly, this disclosure describes a combination of user inputs in which the system recognizes, using at least head tracking, whether the user is trying to peer around the edge of the display, and recognizes, using device movement tracking, whether the user is trying to pan the display.

The computing system may combine these two types of user inputs to work together. In other words, the user may want to view down a street in a mapping application from a particular point of view, and may so move his head sideways with respect to the camera in order to view from the particular point of view. The user may then wish that the display pan so that the user can effectively move down the street. The user can cause such movement of the display, while viewing the street from the particular point of view, by pushing an edge of the computing device away from him.

Further, the computing system may apply these two types of user input against each other simultaneously. As described above with reference to FIGS. 8A-8B, the computing system may not just change the user's point of view of buildings in the displayed map when the user moves his head to the left. Rather, the computing system can also introduce a region 808 of the map. Should the user simultaneously move his head to the left as he moves the right edge of the computing device away from his body, the computing system can weigh indications that the display should pan to the left with indications that the display should pan to the right in order to determine which way the display should pan. The computing system may generate distinct projected position, velocity, and acceleration curves for panning in different directions for each of the types of user input. The computing system may apply the data for one type of user input against the data for the other type of user input in order to determine the actual display position, velocity, and acceleration data.

For example, the computing system may associate a panning velocity of 2 cm a second to the left with the head tracking user input, and a panning velocity of 1 cm a second to the right with the device manipulation user input. The computing system may apply the velocities against each other in order to generate a combined velocity of 1 cm to the left (e.g., one velocity may be subtracted from the other velocity). The velocities can change as the different user inputs change. For example, the user may be pushing the right side of the computing system outward in this example. Accordingly, the movement of the display to the left may slow down and pause until the display begins panning to the right. As such, after a few moments, the computing system may continue to apply a head tracking velocity of 2 cm a second to the left against a device manipulation velocity of 5 cm a second to the right in order to generate a combined velocity of 3 cm a second to the right. This combined velocity is applied to the display that is shown to the user.

In some examples, the orientation of the computing system may be determined without using head tracking information. Rather, the computing system may use the orientation determining devices. On the other hand, the computing system may use data from the orientation determining devices to determine whether the user has moved his head or has just moved the computing system.

For example, the user's head may move to the right in an image taken by the computing system both when the user pushes the right edge outward and when the user moves his head to the left. Should the user move his head to the left while the device is not moved, the computing system may be able to recognize the entire user's tracked head movement as being actual physical movement of the user's head.

On the other hand, should the user move his head to the left at the same time that the user moves the right edge outward, a component of the head moving to the right in the image is based on manipulation of the computing system and a component is based on the actual physical movement of the user's head. As such, the computing system may determine a change in orientation of the computing system and may access stored data that indicates an extent to which the change in orientation of the computing system affects a level of change in head position as seen by the camera. This amount of "artificial" head movement may be essentially subtracted from the total amount of head movement as seen by the camera. The resulting amount of head movement is a determined actual physical movement of the user's head.

In some examples, the computing system does not use orientation devices to determine the amount of "artificial" head movement. Rather, the computing system may use movement or non-movement of features of the background that surround the user's head to determine whether the device is being moved or if only the head is being moved. In other words, if the background moves, the computing system may determine that the device is moving. If the background does not move, the computing system may determine that only the head is moving.

Figure 10A:
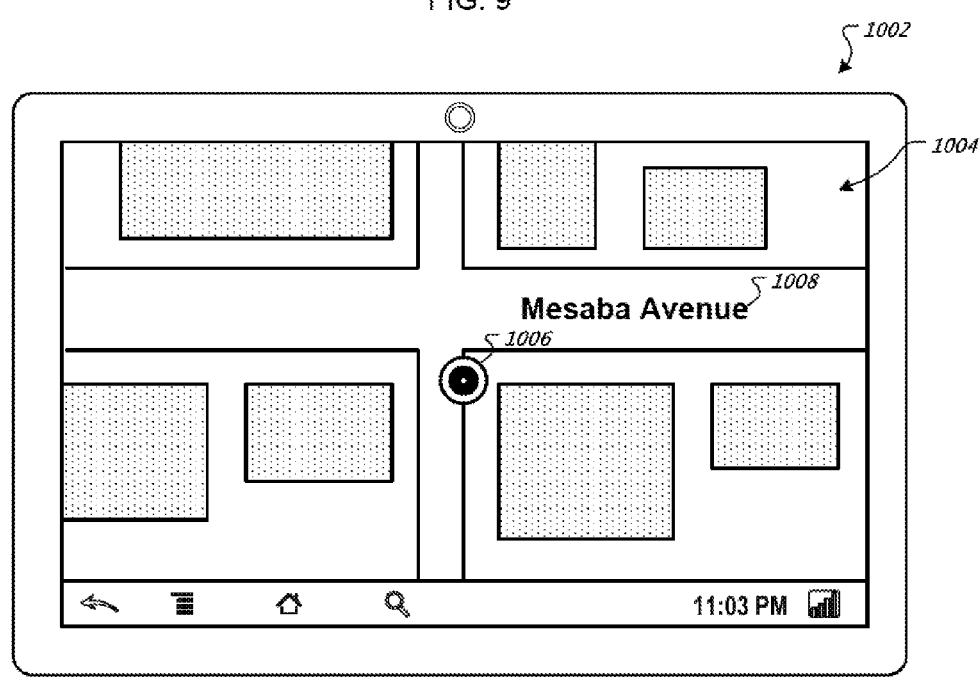
FIGS. 10A-C illustrate user input that causes the computing system to change a level of detail on a display.
Figure 10B:
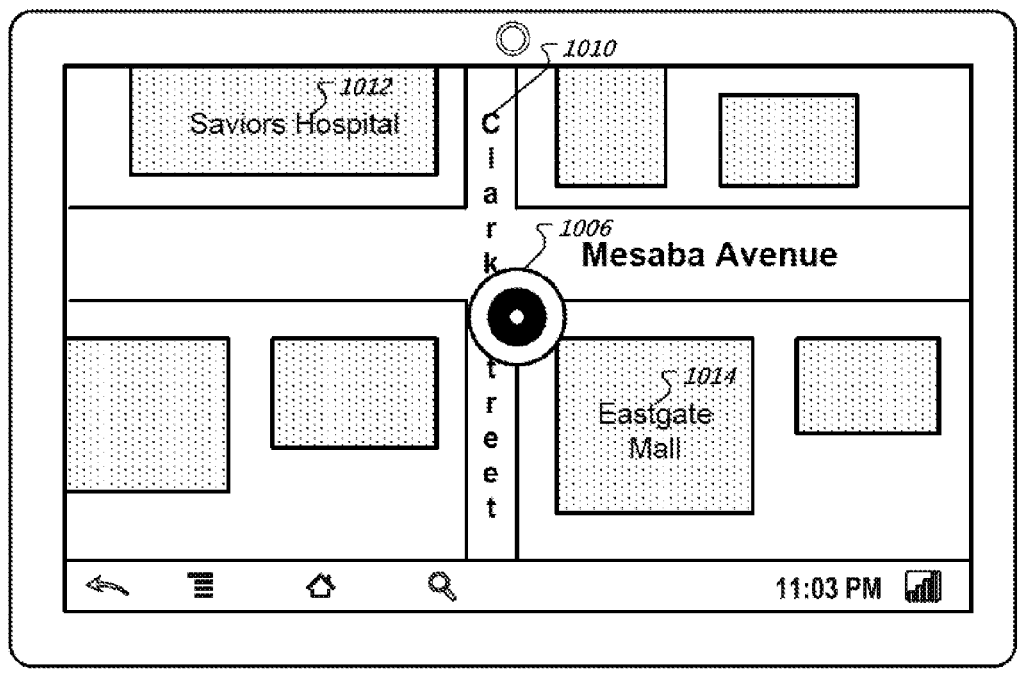
Figure 10C:
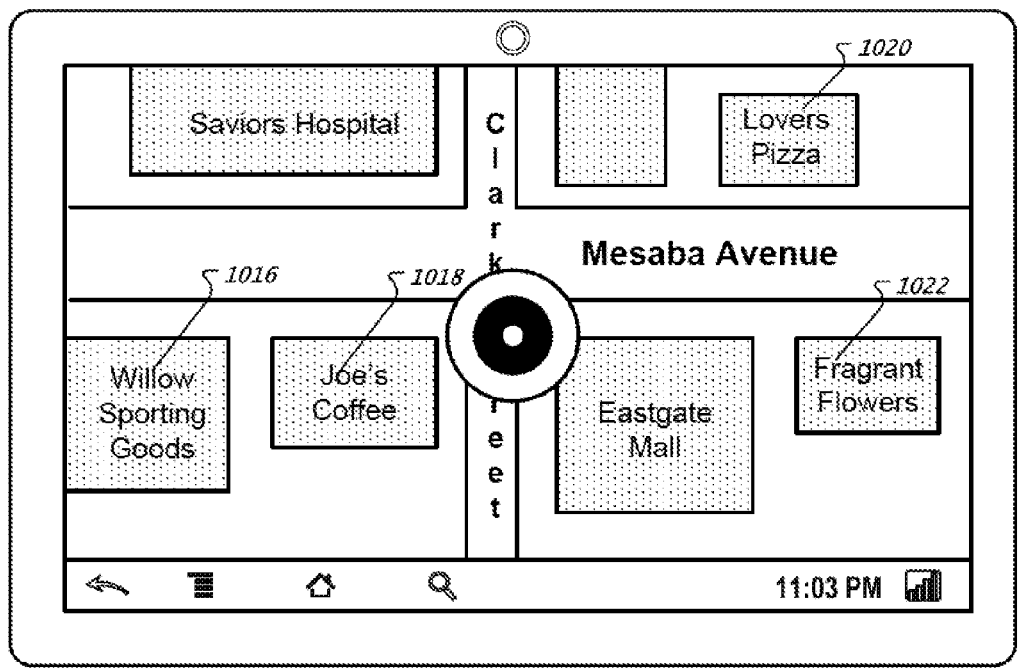

FIGS. 10A-C illustrate user input that causes the computing system to change a level of detail on a display. In this example, the computing system is presenting a display 1004 of graphical content, for example, a geographical map. A user may pan the map and zoom into and out of the map using physical buttons or the touchscreen of the computing system. Touchscreen user input may include the zone-specific gestures that are described with respect to FIGS. 1-5, or may include gestures that are recognized across a surface of the map without regard to such zones.

The computing system may track a position of the user's head in order to provide an extra degree of user control in manipulating content of the display 1004. As described above, the user may move his head side to side in order to change the viewpoint from which the user views three-dimensional features of the display. Further, the user may change the distance between the user's head and the computing device (e.g., the camera) in order to change a level of detail that is presented in the display. The level of detail can be changed even if the user does not provide physical user input. For example, the boundaries of the region of the display 1004 that are presented by the display device may not change but a level of annotations that appear on the display may change.

As an illustration, suppose that FIG. 10A shows a display 1004 in which the user is holding the computing system 1002 at about arm's length distance. The disc 1006 shows a position of the user's head with respect to the computing system 1002. In this example, the disc 1002 is near the center of the display 1004 and, as such, the system is not presenting the buildings in the map with three-dimensional characteristics. The display 1004 includes a single annotation 1008 that identifies a name for a single street on the map.

FIG. 10B shows the display after the computing system has determined that the user's head has moved closer to the display. The computing system may determine that the user's head has moved closer in response to the user moving his head towards the device or the user moving the device closer to the user's head. The decreased distance between the user's head and the device is illustrated by the increased size of the disc 1006 in FIG. 10B. In response to determining that the user's head has moved closer to the display, the computing system increases the level of detail that is presented in the display. For example, the display now includes an annotation for "Clark Street" 1010, "Saviors Hospital" 1012, and "Eastgate Mall" 1014.

FIG. 10C shows the display after the user's head has moved even closer to the display. In this example, an even greater level of detail is presented on the display. For example, the display now shows annotations for "Willow Sporting Goods" 1016, "Joe's Coffee" 1018, "Lovers Pizza" 1020, and "Fragrant Flowers" 1022.

In various examples, the computing system adds annotations, as the distance between the user's head and the camera decreases, without removing any annotations (although some annotations may at least partially cover other annotations). For example, in FIGS. 10A-C, the annotation "Mesaba Avenue" 1008 remains as part of the display even as the user's head moved closer to the display.

In various examples, the computing system does not change a scale of the display, based on the change in distance between the user's head and the computing system, as the distance between the user's head and the device changes. For example, if the user set the computing device down on a table and moved his head around in front of the device's camera, the size of the buildings in the display may not change. In other words, the user may not be able to zoom in or out by using his head. In some examples, the boundary of the region that is displayed may remain fixed. In other examples, while the boundary of the region may move in response to the user's head movements (e.g., the display may pan based on head movement), the boundary may remain fixed in scale with respect to the underlying content. Rather, the user may have to use touchscreen gestures to zoom into and out of the display.

In some examples, the computing system does change a scale of the display based on the change in distance between the user's head and the device. The scale, however, may also be changed with touch input gestures. In other words, a user may move his head towards the computing system in order to increase the level of detail and slightly zoom in, and may move his head away from the device in order to decrease the level of detail and slightly zoom out (e.g., by zooming smaller). The change in position of the user's head causes an absolute change in scale. In other words, the effect of zooming based on the position of the user's head may be fixed to the position of the user's head. The display may zoom in as the user moves his head towards the camera. If the user tries to repeat this action by moving his head backwards and forwards again the display may simply zoom out and then back in.

Relative zooming user input operations may be performed using touch gestures. The touch gestures may provide relative changes in scale that may be repeated until a desired scale of the display is achieved. For example, the user may tap a zoom button or pinch and spread his fingers three times in order to zoom in three times.

In various examples, the computing system changes a level of detail of a display by changing a level of a three-dimensional representation of a geographical area. For example, as the user moves the computing system towards his head, the display may change from a two-dimensional representation of a map to a three-dimensional representation of the map.

As an illustration, suppose that a user who is viewing the display of FIG. 8B pushed the computing system away from his head while his head remained at the location of disc 810 (i.e., offset from a center of the display), and that the display changed to a display like that in FIG. 8A (although, in this illustration, the display may not pan to remove the region 808 from display). In such an example, computing system removes at least some of the three-dimensional characteristics of the buildings (e.g., features of the sides of the buildings). As such, a user may decrease the distance between display device and the user's head in order to view a display with three-dimensional characteristics. In some examples, once the user has brought the computing system close to the user's head to invoke a three-dimensional display, the user may move his head or the computing system side to side in order to change a three-dimensional viewpoint of the three-dimensional display.

In various examples, the computing system changes a level of detail of a display by changing a level to which a geographical map displays a photographical image of an associated geographical region. For example, as a user changes the distance between the computing system and the user, the computing system can transform a photographical image of the associated geographical region to a road map, and vice versa. For example, as the user moves the computing system closer to his head, roads may begin to overlay a photographical image of a region. In some examples, as the user further moves the device closer to his head, the photographical image is replaced by the background of a street map. In some examples, the street map does not include a photographical depiction of the region. As such a user may move from a "satellite view" representation of a geographical area, to a "hybrid view" representation of the geographical area, to a "street map" representation of the geographical area.

In various examples, the computing system changes a level of detail that is presented with a displayed object based on a distance between a user's head and the computing device. For example, the user may be viewing a display of an album in a cover flow graphical interface display of albums. The user may swipe his fingers left or right across a touchscreen in order to switch from a display of one album to another. The albums may initially display an image of a cover of the album. To view information on the album, the user may bring the computing device toward his head. As the user brings the computing device to his head, the computing system may add track listing information to the display. As the user brings the computing device even closer to his head, the computing system may further add to the display information about the musical group that created the album. In some examples, the information about the musical group replaces the track listing information. The computing system may overlay such track listing information, and information about the musical group, over the cover of the album.

Figure 11:
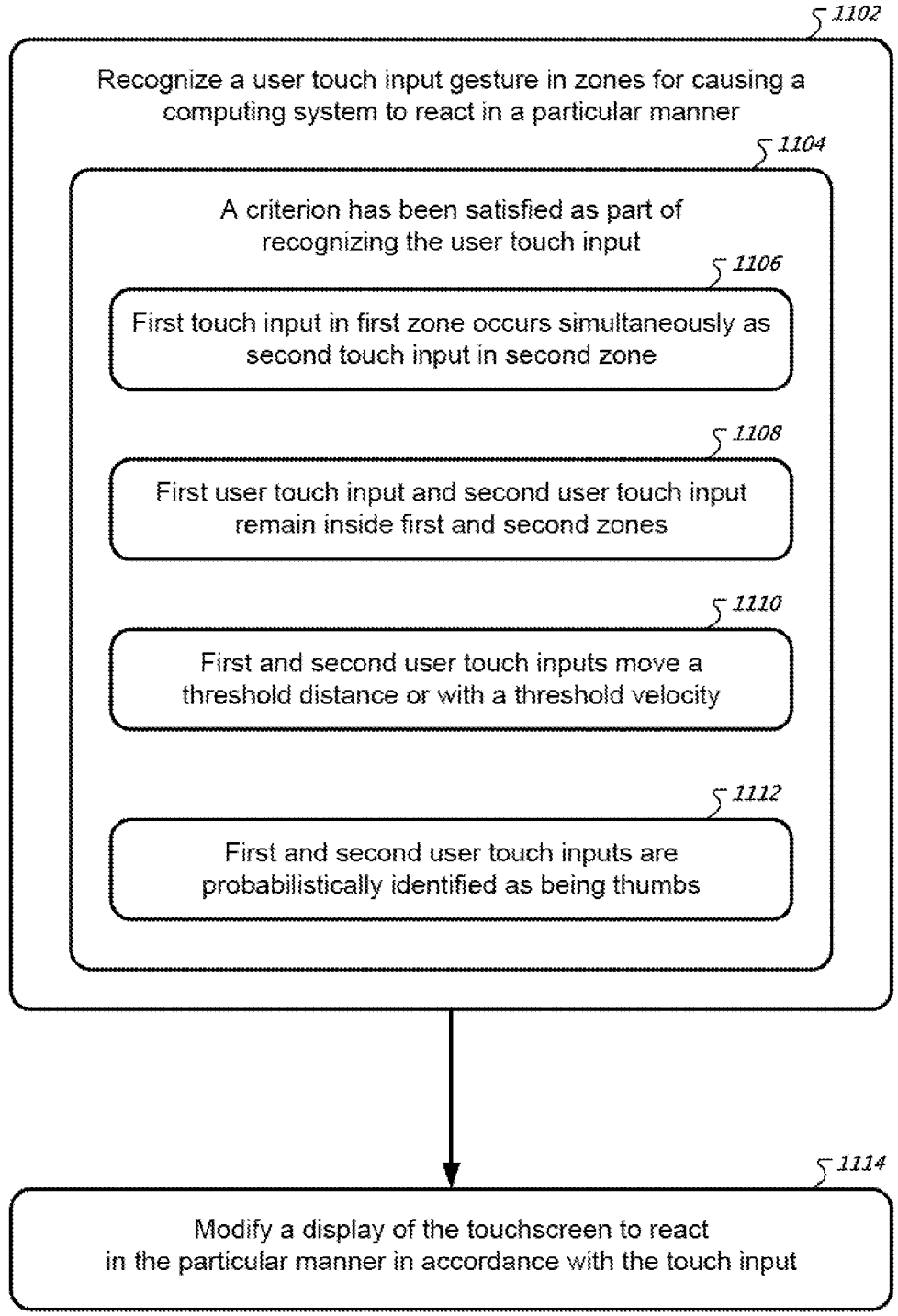
FIG. 11 shows a flowchart of an example method for recognizing region-specific user input.

FIG. 11 shows a flowchart of an example method for recognizing region-specific user input. The method is further described throughout this disclosure, for example, with reference to FIGS. 1-5.

In box 1102, a computing system recognizes a touch input gesture in zones for causing a computing system to react in a particular manner. For example, a handheld computing device that includes a touchscreen may sense that a user has performed a gesture that includes touch input in two zones of the touchscreen. Both of the zones are recognized by the computing system as being arranged for causing the computing system to recognize the touch input gesture and perform a particular user input action. The computing system may be configured so that the same action does not occur if the same gesture is performed outside of the zones.

In box 1104, the computing system recognizes that a criterion has been satisfied as part of the computing system recognizing that the touch input gesture was performed. The computing system may be configured so that the touch input gesture is not recognized should the criterion not be satisfied. Example criterion are illustrated in boxes 1106, 1108, 1110, and 1112, however, other criterion are described throughout this disclosure. The criterion that has to be satisfied may include any combination of one or more of the criterion that are described with respect to the flowchart of FIG. 11 or throughout this disclosure.

In box 1106, the criterion includes a first touch input in the first zone (e.g., zone 106a) occurring simultaneously as a second touch input in a second zone (e.g., zone 106b). For example, a user may place his thumbs in the first and second zones, and may swipe them away from each other at the same time in order for the computing system to recognize the touch input gesture (and, in response, modify the display in accordance with the touch input gesture, as described below with reference to box 1114). On the other hand, and in some examples, the computing system may not recognize the touch input gesture should the user swipe one thumb across the touchscreen, lift the thumb from the touchscreen, and thereafter swipe the other thumb across the touchscreen.

In some examples, the computing system may not recognize the touch input should the computing system recognize that a third touch input occurs simultaneously with the first and second touch inputs. For example, each touch input may be recognized as a semi-circular region of physical contact with the touchscreen. Should the computing system determine that a third touch input has made contact with the touchscreen at a same time as the first and second touch inputs, the computing system may not recognize any subsequent movement of the three touch inputs as being the touch input gesture. Such a third touch input may occur when the user has placed his hands over the display and is contacting the touchscreen with more than one finger of at least one hand, rather than grasping the computerized device with both hands so that the user's thumbs curl around the front of the computerized device and contact the touchscreen while the other fingers curl around the back of the computerized device.

In box 1108, the criterion includes a first touch input and a second touch input remaining inside of a first zone and a second zone throughout the touch input. For example, the computing system may not recognize the touch input should one or both of the first touch input and the second touch input move outside of the zones. In some examples, the criterion includes a first touch input and a second touch input starting inside of a first zone and a second zone, respectively. The first and second touch inputs, however, may leave the first zone and the second zone and still cause the computing system to invoke the associated user input action. The various techniques for recognizing a touch input gesture based on location of the component touch inputs with respect to the zones is described with reference to FIG. 2.

In box 1110, the criterion includes a first and second touch inputs moving a threshold distance or with a threshold velocity. For example, both a first touch input in a first zone and a second touch input in a second zone may have to move a specified distance after contact with the touchscreen in order for the computing system to invoke an action that corresponds to an associated gesture. In some examples, the first touch input and the second touch input may have to move a distance within a threshold time in order for the computing system to invoke an associated action. As such, the user may rest his thumbs in the first zone and the second zone without the computing system recognizing user input and invoking an associated action when the user makes minor or slow changes to the user's resting thumb position. The various techniques for recognizing that touch input has moved a threshold distance or with a threshold velocity are described with reference to FIG. 4.

In some examples, the computing system recognizes that the touchscreen has been contacted with a single touch input in the first zone and a single touch input in the second zone and, in response, does not invoke any user input action to change the display based on touch input with the touchscreen. In effect, the computing system turns off any touchscreen user input when the user rests his fingers in the specified zones. Should the user rest his thumbs or other fingers outside of the specified zones, however, the computing system may recognize user input based on small movements of the user's thumbs or other fingers (e.g., small zooming based on finger quiver or repositioning).

In box 1112, the criterion includes a first touch input in the first zone and a second touch input in the second zone being probabilistically identified as being thumbs. For example, the computer system may compare regions that correspond to the first and second touch inputs to models that represent the boundaries and orientations of various finger touchscreen contacts in order to determine if the regions represent models of thumbs rather than models of other fingers of a hand. The computer system may compare the regions to determine whether the fingers are oriented in a manner that suggest that the fingers are thumbs while the user is holding the device with the other fingers wrapped around the back of the device. The computer system may further or alternatively determine whether sensors on the back of the device recognize that one or more fingers are contacting the back of the device.

In box 1114, in response to the computing system recognizing the touch input gesture in the zones, the computing system modifies a display of the touchscreen to react in the particular manner in accordance with the touch input gesture. For example, the particular manner may be a panning operation, where a direction of the panning operation is determined based on the direction to which both of the fingers swiped. Further user input actions are described with reference to FIG. 3.

Figure 12:
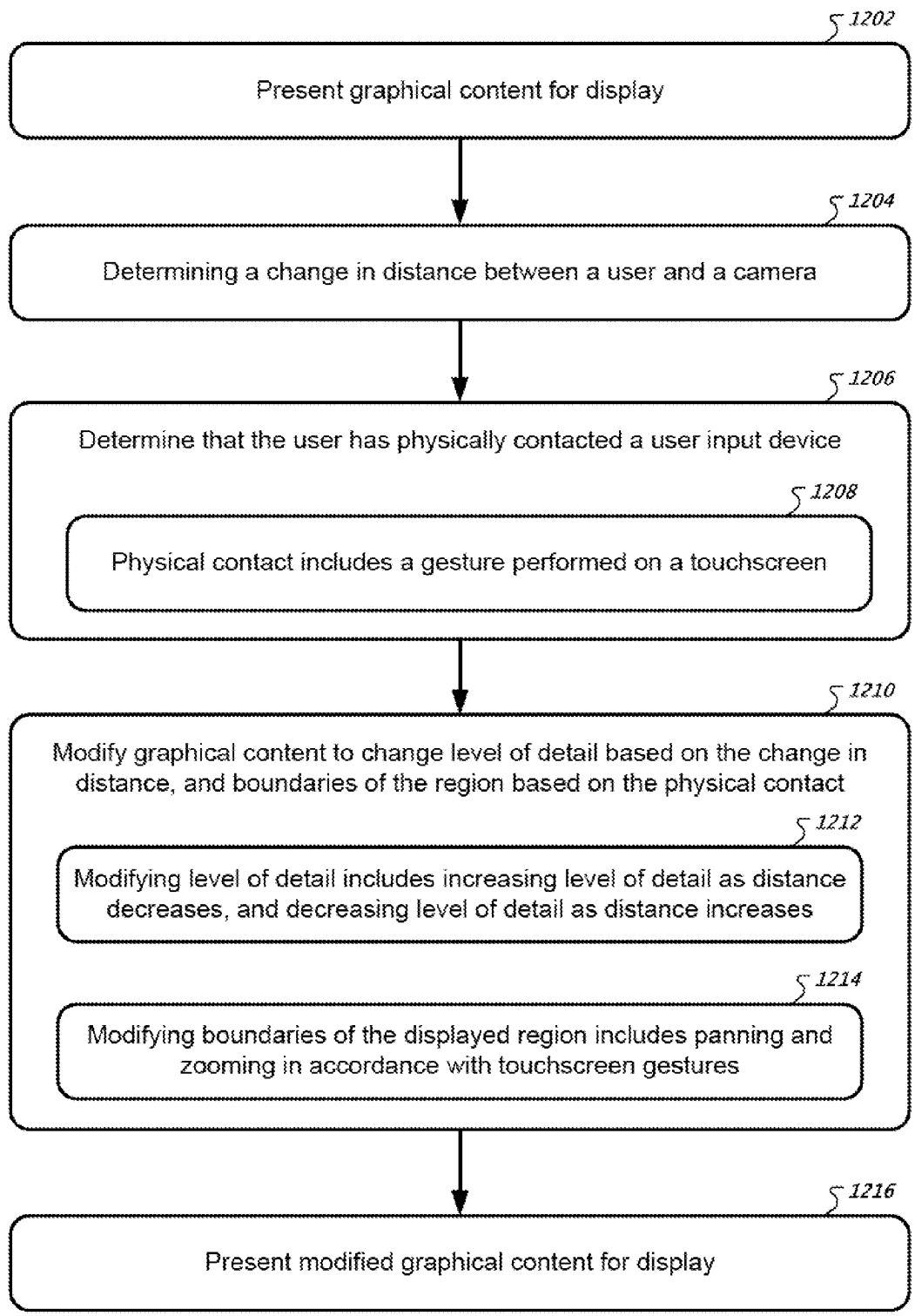
FIG. 12 shows a flowchart of an example method for recognizing a user-input combination of touch and user position.

FIG. 12 shows a flowchart of an example method for recognizing a user-input combination of touch and user position. The method is further described throughout this disclosure, for example, with reference to FIGS. 10A-10O.

In box 1202, the computing system presents graphical content for display on a display device. For example, the computing system can present a display of a map that illustrates geographical features of the world.

In box 1204, the computing system determines a change in distance between a user and a camera of the computing system by tracking a visible physical feature of the user through a series of images that are captured by the camera. As described throughout this disclosure, the computing system may request that the camera take multiple images, and the computing system may identify a location of a feature of the user in each of the multiple images (e.g., a location of the user's face). The computing system may determine the change in distance, for example, by determining a size of the user's face in a first image, and determining a size of the user's face in a second image. Determining the change in distance may not include determining how much of a change in distance has occurred, but rather can include determining that a change in distance did occur.

In box 1206, the computing system determines that the user has physically contacted a user input device of the computing system. For example, the computing system may determine that the user has pushed down on a button or a rocker switch.

In box 1208, determining that the user has physically contacted a user input device includes determining that the physical contact performed a gesture on a touchscreen. For example, the computing system may determine that the user has physically touched a surface of the touchscreen or swiped a finger across the surface of the touchscreen in a manner that is recognized by the computing system as for invoking a predefined user input action. The touchscreen may be the display device that is presenting the graphical content.

In box 1210, the computing system modifies the graphical content to change a level of detail of the graphical content based on the determined change in distance between the user and the camera, and boundaries of a displayed region of the graphical content based on the determined physical contact with the user input device. Changing boundaries of a displayed region of graphical content can include moving the boundaries with respect to the graphical content so that the displayed region pans, tightening the boundaries with respect to graphical content so that the display zooms in and the graphical content is displayed at an increased scale (i.e., the graphical content is larger), and loosening the boundaries with respect to graphical content so that the display zooms out and the graphical content is displayed at a decreased scale.

For example, the computing system may change the boundaries of the displayed region of the graphical content by panning the displayed region in a direction or zooming into or out of the displayed region in response to the user performing a multi-touch touchscreen gesture. As such, changing the boundaries can include changing the boundaries with respect to the content that is displayed so that additional content is displayed in response to a zooming out or panning operation, and so that content is removed from the display in response to a zooming in or panning operation.

In box 1212, modifying the level of detail includes increasing the level of detail as the distance between the user and the camera decreases, and decreasing the level of detail as the distance between the user and the camera increases. In other words, much as a user may hold a newspaper closer to their face in order to more clearly read the content of the newspaper, the user may bring a computing device that includes a camera closer to their face in order to not only view the content with greater ease, but to view additional content that the computing system adds to the display. In other examples, modifying the level of detail includes decreasing the level of detail as the distance between the user and the camera decreases, and increasing the level of detail as the distance between the user and the camera increases.

In some examples, the physical contact and the change in distance between the user and the camera are determined to occur simultaneously. In response, the computing system may, in at least some of the images that are displayed by the touchscreen during the simultaneous change, change a level of detail of an image and change a boundary of the region in a same image. In some examples, the physical contact and the change in distance between the user and the camera occur at different times. For example, the user may move his head closer to the camera in order to cause the computing system to display graphical content with greater detail. The user may then zoom the display inwards using a multi-touch gesture.

In some examples, the computing system does not modify the boundaries of the displayed region in response to the user changing a position of his head. For example, the boundaries of the region may remain fixed as the user moves his head towards or away from the display and the level of detail changes accordingly. In other examples, the boundaries of the region may change to an extent as the user moves his head towards or away from the display, but the change in boundaries may be based on an absolute distance of the user's head with respect to the camera. In contrast, the user may perform repeated, relative changes in region boundaries using the physical user-input gestures described herein.

As described throughout this disclosure, the change in level of detail can include adding annotations to and removing annotations from a geographical map (e.g., street names, business names, and names for places of interest). Further, the change in level of detail can include changing the map display from a satellite view to a street map view, or changing the display from a two-dimensional view of a geographical area to a three-dimensional view of the geographical area. Alternatively, the change in level of detail can include changing a level of information that is displayed along with an object that has focus from among a set of objects. The user may change the object that has focus, for example, by contacting the user's finger to the focused object and swiping the user's finger laterally across the display. The level of detail for objects that do not have focus may not change as the user moves his head towards or away from the computing system. An object may have focus when the object is a currently displayed object from a set of objects, in which at least some of the set of objects are not currently displayed In box 1214, modifying the boundaries of the displayed region includes panning and zooming the display in accordance with touchscreen gestures. For example, the user may touch one or more fingers to the display, and drag the one or more fingers across the display (together as a group if more than one finger) in order to pan the display. Panning the display can include moving a boundary of the displayed region to change the x and y coordinates of the boundary with respect to graphical content, but leaving a scale of the content in the displayed region the same. In other words, in some examples, the system may not zoom in or out of the displayed region in response to a panning operation.

In box 1216, the computing system presents the modified graphical content for display. For example, the computing system may present a different region of graphical content based on a change in boundaries. The different region of graphical content may include an increased or decreased level of annotations.

Figure 13:
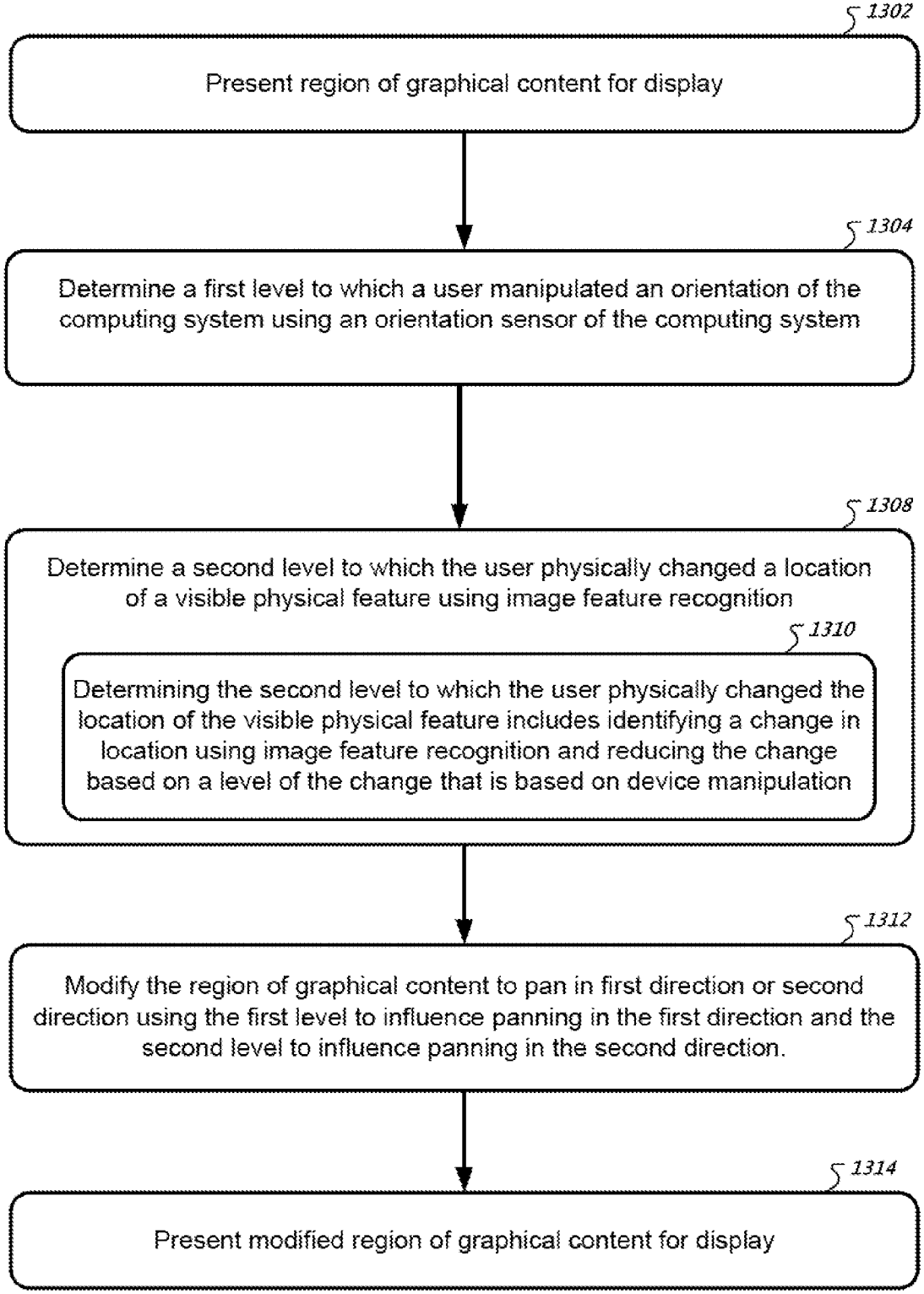
FIG. 13 shows a flowchart of an example method for recognizing a user-input combination of device orientation and user position.

FIG. 13 shows a flowchart of an example method for recognizing a user-input combination of device orientation and user position. The method is further described throughout this disclosure, for example, with reference to FIGS. 8A-8B and 9.

In box 1302, the computing system presents a region of graphical content for display. For example, the computing system may present a region of a web page or a region of a geographical map for display on a handheld computing device.

In box 1304, the computing system determines, using an orientation sensor of the computing system, a first level to which a user manipulated an orientation of the computing system. For example, the computing system may determine that an accelerometer or gyroscope of the computing system sensed a change in orientation or position of the computing system (e.g., based on a change in acceleration or velocity). The user manipulation of the computing system may cause a position of a visible physical feature of the user to change in a manner relative to the computing system. For example, if the user pushes a right edge (with respect to the user) of a handheld computing device outward and away from his body, but retains the left edge in its original position, images that are captured by the computing device's camera may show the user's head moving rightward in the images.

In some examples, the computing system associates the first level with a velocity for which the region of the graphical content is to pan. For example, the computing system may determine a velocity at which to pan the display in a direction based on a determined difference between a position of an edge of the computing system with respect to an opposing edge (e.g., with reference to a "resting" position in which the computing system determined that the user was holding the computing device in front of him based on a feature of the user being centered in an image taken by the computing system camera). As such, the farther a user pushes the edge away from the user, the faster velocity at which the display may pan.

In box 1308, the computing system determines, by tracking a visible physical feature of the user through a series of images that are taken by a camera of the computing system, a second level to which the user physically changed a location of the visible physical feature. For example, the computing system may identify first x-y coordinates of a user's head in a first image, and may identify second x-y coordinates of the user's head in a second image. The computing system may determine the change by identifying that the second x-y coordinates are different from the first x-y coordinates. The computing system may also determine the change by calculating a difference between the first x-y coordinates and the second x-y coordinates.

In some examples, the physical change in location of the visible physical feature causes the position of the visible physical feature of the user relative to the computing system to change in the same manner as when the user moved the device. For example, as the user moves his head to the left, images that are captured by the computing device's camera may show the user's head moving rightward in the images, similar to if the user moved the right edge of the computing device away from the user's body.

In some examples, determining the second level to which the user physically changed the location of the visible physical feature of the user includes identifying, based on tracking the visible physical feature in a series of images, a change in location of the visible physical feature in the images, and reducing the identified change in location based on the determined first level to which the user manipulated the orientation of the computing system. In other words, the computing system is trying to identify an extent to which the user physically moved his head (and has not just moved the computing device) using image feature tracking, and thus may discount from any determined movement of the user's head in images an extent to which movement of the device causes the movement of the user's head.

Said in another manner, the computing system can take a determined change in location of the user's head as calculated using image analysis head tracking techniques, and can remove from the determined change in location an amount of the change in location that is probabilistically determined to result from the user manipulating the orientation of the computing device. The computing system may treat the resulting change in location of the user's head as a level to which the user has physically moved his head.

In some examples, the computing system associates the second level with a position to which the region of graphical content is to pan. As an illustration, the user may move his head to his left 10 cm, and in response the computing system may determine that at least part of the region of the display should pan to the user's left 5 cm and stop panning. The panning component that is based on the position of the user's head may be absolute panning. In some examples, the panning may not be instantaneously performed upon recognizing the change in location of the user's head. Rather, a physics engine may associate the displayed content with a "weight" so that the displayed content accelerates and decelerates in accordance with the assigned weight.

In box 1312, the computing system modifies the region of graphical content that is for display by the display device to pan in either a first direction or a second direction that opposes the first direction by using the first level to influence panning in the first direction and the second level to influence panning in the second direction. For example, a user of the computing system may push an edge of the computing system away from the user at the same time as the user moves his head sideways in a direction that is away from the pushed edge.

As such, the computing system may combine values that were calculated, for panning the device in the first direction, based on physical movement of the computing system, with values were calculated, for panning the device in the second direction, based on determined physical movement of the user's head. In the above-described scenario, these movements influence panning in different directions. Accordingly, the user may change a position of his head to slow down or even reverse panning that the computing system is performing in response to a determined user manipulation of the orientation of the computing system.

In box 1314, the computing system presents a modified region of graphical content for display. For example, the region has been modified to pan in a direction so as to display other graphical content. This modified region is presented for display by the display device.

Figure 14:
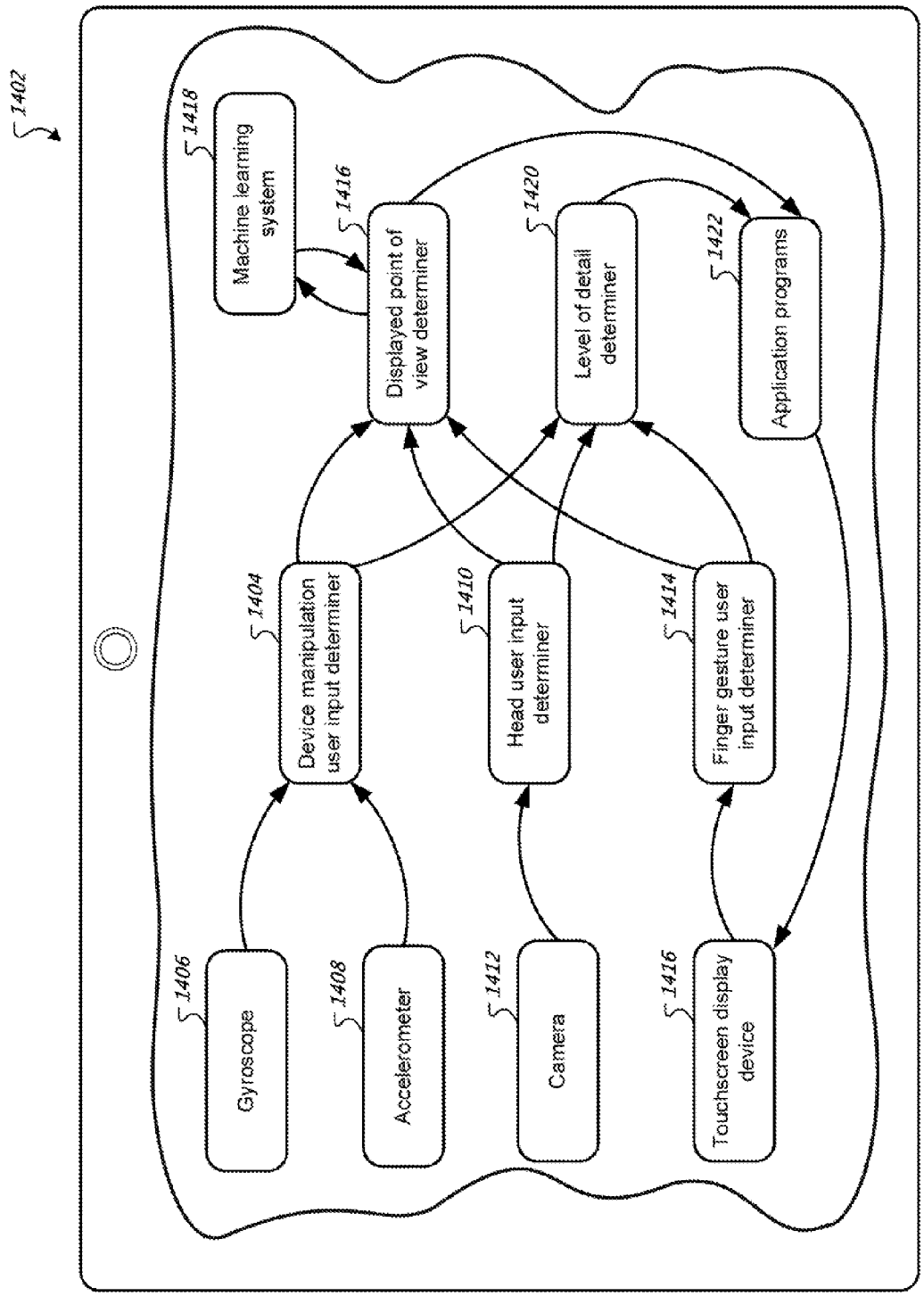
FIG. 14 shows a schematic diagram of a system for receiving user input.

FIG. 14 shows a schematic diagram of a system 1402 for receiving user input. The system 1402 may include a device manipulation user input determiner computing subsystem 1404. The device manipulation user input determiner 1404 determines an extent to which the computing system has been physically manipulated to change in orientation and position. In some examples, the device manipulation user input determiner uses the gyroscope 1406, the accelerometer 1408, or both the gyroscope 1406 and the accelerometer 1408 to identify any combination of one or more of an orientation of the computing system, a velocity of the computing system, or an acceleration of the computing system.

The system 1402 may include a head user input determiner computing subsystem 1410. The head user input determiner 1410 receives images from the camera 1412 and performs image feature recognition processes to identify a location of the user's head in the images. The head user input determiner 1410 may be able to identify any combination of one or more of a location of the user's head, an orientation of the user's head, a velocity of the user's head, and an acceleration of the user's head. The head user input determiner may perform similar operations to identify other features of the user.

The system 1402 may include a finger gesture user input determiner 1414. The finger gesture user input determiner 1414 can recognize touch input that contacts the touchscreen display device 1416, and can determine whether the touch input satisfies criterion for any one of multiple user input gestures. If touch input is recognized as satisfying the criterion for a user input gesture, the figure gesture user input determiner 1414 can alert other computing subsystems that the user input gesture has been performed.

The system 1402 may include a displayed point of view determiner computing subsystem 1416. The displayed point of view determiner 1416 can receive from the device manipulation user input determiner 1404 an indication of an orientation of the computing system 1402 or a manner in which the computing system 1402 was manipulated. The displayed point of view determiner 1416 can further or alternatively receive from the head user input determiner 1410 an indication of a position of a user's head or movement of the user's head. The displayed point of view determiner 1416 can further or alternatively receive from the finger gesture user input determiner 1414 an indication of a gesture that a user performed on the touchscreen display device 1416.

The displayed point of view determiner 1416 can use one or more of the received indications to modify a point of view that is presented by the computing system 1402. For example, the computing system may pan the display, change a scale of the display (e.g., by zooming in or out), rotate the display, or move a viewpoint around in three-dimensional space based on user movement of the device, user movement of the user's head, or user-specified gestures. Modifying the point of view is discussed in further detail throughout this disclosure.

In some examples, the displayed point of view determiner 1416 communicates with a machine learning system 1418 to refine the user input gestures to suit a particular user's preference. For example, the machine learning system 1418 may record at least some of the user's input (e.g., as determined by any of computing subsystems 1404, 1410, and 1414). The machine learning system 1418 may be able to determine when a user provides user input and thereafter, within a threshold amount of time, provides an opposing user input (e.g., because the user "overshot" in a first user input panning gesture and had to correct himself). In such instances, the machine learning system may reduce the impact of the user input action (e.g., by reducing the velocity of the panning gesture) so that the user does not overshoot in the first user input.

The computing system 1402 includes a level of detail determiner computing subsystem 1420. As described above with respect to the displayed point of view determiner 1416, the level of detail determiner 1420 can receive indications of various types of user input from the device manipulation user input determiner 1404, the head user input determiner 1410, and the finger gesture user input determiner 1414. The level of detail determiner 1420 can use the received indications to determine the level of detail that may be displayed for graphical content. Determining the level of detail is described throughout this disclosure, for example, with reference to FIGS. 10A-10B and 12 (boxes 1210, 1212, and 12124).

The level of detail determiner 1420 and the displayed point of view determiner 1416 may, in some examples, directly modify content that is presented for display by the touchscreen display device 1416. In other examples, however, the level of detail determiner 1420 and the displayed point of view determiner 1416 provide information on the relevant point of view and/or level of detail to a presently focused application program 1422. A focused application program uses such information to modify the display according to instructions that are specific to the focused application program. For example, a geographical mapping application program may respond to information that indicates that a greater level of detail is to be displayed differently than a media player application program.

Figure 15:
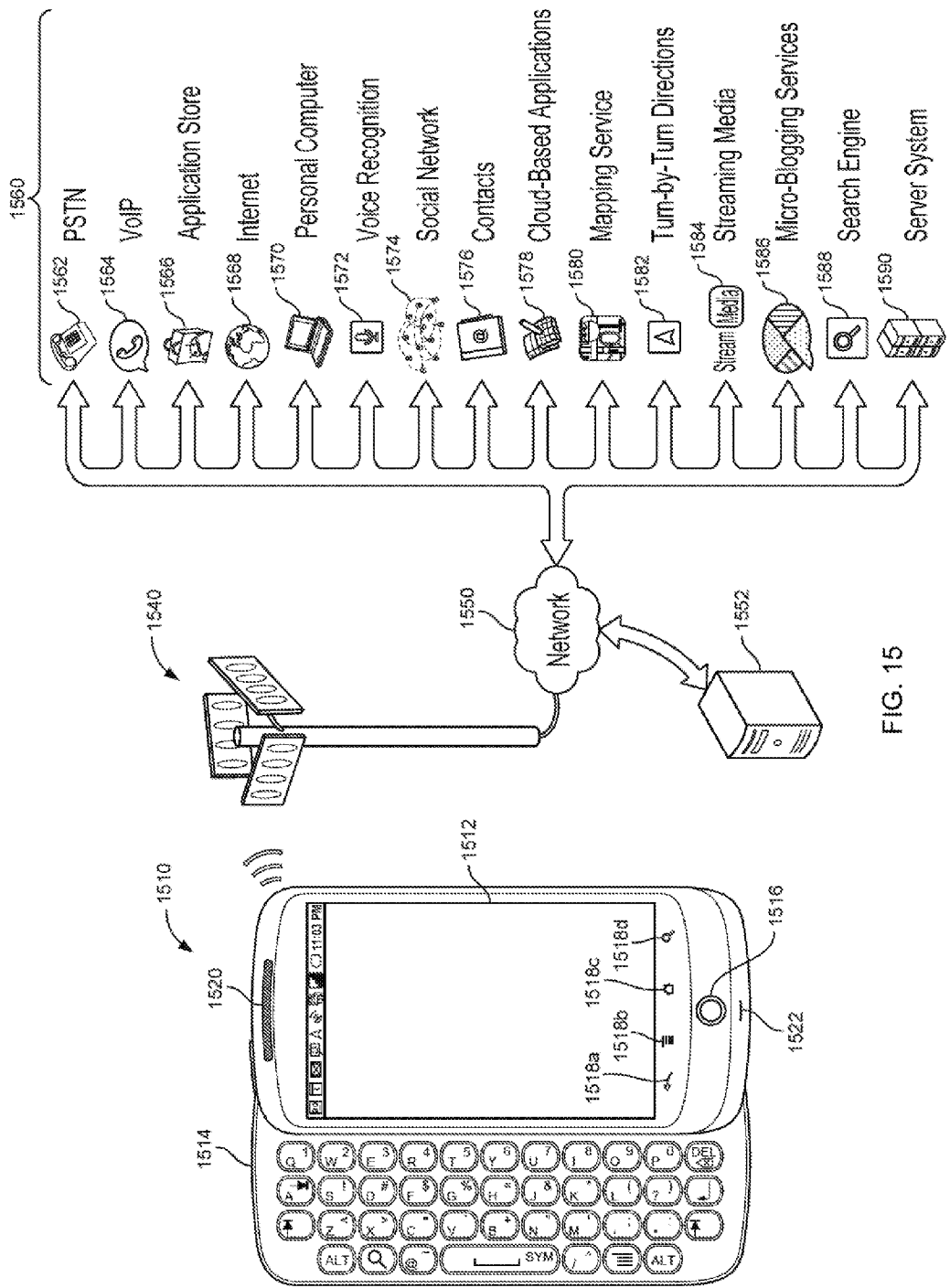
FIG. 15 is a conceptual diagram of a system that may be used to implement the systems and methods described in this document.

Referring now to FIG. 15, a conceptual diagram of a system that may be used to implement the systems and methods described in this document is illustrated. In the system, mobile computing device 1510 can wirelessly communicate with base station 1540, which can provide the mobile computing device wireless access to numerous hosted services 1560 through a network 1550.

In this illustration, the mobile computing device 1510 is depicted as a handheld mobile telephone (e.g., a smartphone, or application telephone) that includes a touchscreen display device 1512 for presenting content to a user of the mobile computing device 1510 and receiving touch-based user inputs. Other visual, auditory, and tactile output components may also be provided (e.g., LED lights, a speaker for providing tonal, voice-generated, or recorded output, or vibrating mechanisms for tactile output), as may various different input components (e.g., keyboard 1514, physical buttons, trackballs, accelerometers, gyroscopes, and magnetometers).

Example visual output mechanism in the form of display device 1512 may take the form of a 3.7 or 4.3 inch LED or AMOLED display with resistive or capacitive touch capabilities, for displaying video, graphics, images, and text, and coordinating touch input locations with the location of displayed information so that user contact at a location of a displayed item may be associated with the item by the device 1510. The mobile computing device 1510 may take alternative forms also, including as a laptop computer, a tablet or slate computer, a personal digital assistant, an embedded system (e.g., a car navigation system), a desktop personal computer, or a computerized workstation.

An example mechanism for receiving user-input includes keyboard 1514, which may be a full qwerty keyboard or a traditional keypad that includes keys for the digits '0-9', '*', and '#.' The keyboard 1514 receives input when a user physically contacts or depresses a keyboard key. User manipulation of a trackball 1516 or interaction with a track pad enables the user to supply directional and rate of rotation information to the mobile computing device 1510 (e.g., to manipulate a position of a cursor on the display device 1512).

The mobile computing device 1510 may be able to determine a position of physical contact with the touchscreen display device 1512 (e.g., a position of contact by a finger or a stylus). Using the touchscreen 1512, various "virtual" input mechanisms may be produced, where a user interacts with a graphical user interface element depicted on the touchscreen 1512 by contacting the graphical user interface element. An example of a "virtual" input mechanism is a "software keyboard," where a keyboard is displayed on the touchscreen and a user selects keys by pressing a region of the touchscreen 1512 that corresponds to each key.

The mobile computing device 1510 may include mechanical or touch sensitive buttons 1518*a-d*. Additionally, the mobile computing device may include buttons for adjusting volume output by the one or more speakers 1520, and a button for turning the mobile computing device on or off. A microphone 1522 allows the mobile computing device 1510 to convert audible sounds into an electrical signal that may be digitally encoded and stored in computer-readable memory, or transmitted to another computing device. The mobile computing device 1510 may also include a digital compass, an accelerometer, proximity sensors, and ambient light sensors.

An operating system may provide an interface between the mobile computing device's hardware (e.g., the input/output mechanisms and a processor executing instructions retrieved from computer-readable medium) and software. Example operating systems include the ANDROID mobile device platform; APPLE IPHONE/MAC OS X operating systems; MICROSOFT WINDOWS 7/WINDOWS MOBILE operating systems; SYMBIAN operating system; RIM BLACKBERRY operating system; PALM WEB operating system; a variety of UNIX-flavored operating systems; or a proprietary operating system for computerized devices. The operating system may provide a platform for the execution of application programs that facilitate interaction between the computing device and a user.

The mobile computing device 1510 may present a graphical user interface with the touchscreen 1512. A graphical user interface is a collection of one or more graphical interface elements and may be static (e.g., the display appears to remain the same over a period of time), or may be dynamic (e.g., the graphical user interface includes graphical interface elements that animate without user input).

A graphical interface element may be text, lines, shapes, images, or combinations thereof. For example, a graphical interface element may be an icon that is displayed on the desktop and the icon's associated text. In some examples, a graphical interface element is selectable with user-input. For example, a user may select a graphical interface element by pressing a region of the touchscreen that corresponds to a display of the graphical interface element. In some examples, the user may manipulate a trackball to highlight a single graphical interface element as having focus. User-selection of a graphical interface element may invoke a pre-defined action by the mobile computing device. In some examples, selectable graphical interface elements further or alternatively correspond to a button on the keyboard 1504. User-selection of the button may invoke the pre-defined action.

In some examples, the operating system provides a "desktop" user interface that is displayed upon turning on the mobile computing device 1510, activating the mobile computing device 1510 from a sleep state, upon "unlocking" the mobile computing device 1510, or upon receiving user-selection of the "home" button 1518*c*. The desktop graphical interface may display several icons that, when selected with user-input, invoke corresponding application programs. An invoked application program may present a graphical interface that replaces the desktop graphical interface until the application program terminates or is hidden from view.

User-input may manipulate a sequence of mobile computing device 1510 operations. For example, a single-action user input (e.g., a single tap of the touchscreen, swipe across the touchscreen, contact with a button, or combination of these at a same time) may invoke an operation that changes a display of the user interface. Without the user-input, the user interface may not have changed at a particular time. For example, a user multi-touch input with the touchscreen 1512 may invoke a mapping application to "zoom-in" on a location, even though the mapping application may have by default zoomed-in after several seconds.

The desktop graphical interface can also display "widgets." A widget is one or more graphical interface elements that are associated with an application program that has been executed, and that display on the desktop content controlled by the executing application program. A widget's application program may start with the mobile telephone. Further, a widget may not take focus of the full display. Instead, a widget may only "own" a small portion of the desktop, displaying content and receiving touchscreen user-input within the portion of the desktop.

The mobile computing device 1510 may include one or more location-identification mechanisms. A location-identification mechanism may include a collection of hardware and software that provides the operating system and application programs an estimate of the mobile telephone's geographical position. A location-identification mechanism may employ satellite-based positioning techniques, base station transmitting antenna identification, multiple base station triangulation, internet access point IP location determinations, inferential identification of a user's position based on search engine queries, and user-supplied identification of location (e.g., by "checking in" to a location).

The mobile computing device 1510 may include other application modules and hardware. A call handling unit may receive an indication of an incoming telephone call and provide a user the capability to answer the incoming telephone call. A media player may allow a user to listen to music or play movies that are stored in local memory of the mobile computing device 1510. The mobile telephone 1510 may include a digital camera sensor, and corresponding image and video capture and editing software. An internet browser may enable the user to view content from a web page by typing in an addresses corresponding to the web page or selecting a link to the web page.

The mobile computing device 1510 may include an antenna to wirelessly communicate information with the base station 1540. The base station 1540 may be one of many base stations in a collection of base stations (e.g., a mobile telephone cellular network) that enables the mobile computing device 1510 to maintain communication with a network 1550 as the mobile computing device is geographically moved. The computing device 1510 may alternatively or additionally communicate with the network 1550 through a Wi-Fi router or a wired connection (e.g., Ethernet, USB, or FIREWIRE). The computing device 1510 may also wirelessly communicate with other computing devices using BLUETOOTH protocols, or may employ an ad-hoc wireless network.

A service provider that operates the network of base stations may connect the mobile computing device 1510 to the network 1550 to enable communication between the mobile computing device 1510 and other computerized devices that provide services 1560. Although the services 1560 may be provided over different networks (e.g., the service provider's internal network, the Public Switched Telephone Network, and the Internet), network 1550 is illustrated as a single network. The service provider may operate a server system 1552 that routes information packets and voice data between the mobile computing device 1510 and computing devices associated with the services 1560.

The network 1550 may connect the mobile computing device 1510 to the Public Switched Telephone Network (PSTN) 1562 in order to establish voice or fax communication between the mobile computing device 1510 and another computing device. For example, the service provider server system 1552 may receive an indication from the PSTN 1562 of an incoming call for the mobile computing device 1510. Conversely, the mobile computing device 1510 may send a communication to the service provider server system 1552 initiating a telephone call with a telephone number that is associated with a device accessible through the PSTN 1562.

The network 1550 may connect the mobile computing device 1510 with a Voice over Internet Protocol (VoIP) service 1564 that routes voice communications over an IP network, as opposed to the PSTN. For example, a user of the mobile computing device 1510 may invoke a VoIP application and initiate a call using the program. The service provider server system 1552 may forward voice data from the call to a VoIP service, which may route the call over the internet to a corresponding computing device, potentially using the PSTN for a final leg of the connection.

An application store 1566 may provide a user of the mobile computing device 1510 the ability to browse a list of remotely stored application programs that the user may download over the network 1550 and install on the mobile computing device 1510. The application store 1566 may serve as a repository of applications developed by third-party application developers. An application program that is installed on the mobile computing device 1510 may be able to communicate over the network 1550 with server systems that are designated for the application program. For example, a VoIP application program may be downloaded from the Application Store 1566, enabling the user to communicate with the VoIP service 1564.

The mobile computing device 1510 may access content on the internet 1568 through network 1550. For example, a user of the mobile computing device 1510 may invoke a web browser application that requests data from remote computing devices that are accessible at designated universal resource locations. In various examples, some of the services 1560 are accessible over the internet.

The mobile computing device may communicate with a personal computer 1570. For example, the personal computer 1570 may be the home computer for a user of the mobile computing device 1510. Thus, the user may be able to stream media from his personal computer 1570. The user may also view the file structure of his personal computer 1570, and transmit selected documents between the computerized devices.

A voice recognition service 1572 may receive voice communication data recorded with the mobile computing device's microphone 1522, and translate the voice communication into corresponding textual data. In some examples, the translated text is provided to a search engine as a web query, and responsive search engine search results are transmitted to the mobile computing device 1510.

The mobile computing device 1510 may communicate with a social network 1574. The social network may include numerous members, some of which have agreed to be related as acquaintances. Application programs on the mobile computing device 1510 may access the social network 1574 to retrieve information based on the acquaintances of the user of the mobile computing device. For example, an "address book" application program may retrieve telephone numbers for the user's acquaintances. In various examples, content may be delivered to the mobile computing device 1510 based on social network distances from the user to other members. For example, advertisement and news article content may be selected for the user based on a level of interaction with such content by members that are "close" to the user (e.g., members that are "friends" or "friends of friends").

The mobile computing device 1510 may access a personal set of contacts 1576 through network 1550. Each contact may identify an individual and include information about that individual (e.g., a phone number, an email address, and a birthday). Because the set of contacts is hosted remotely to the mobile computing device 1510, the user may access and maintain the contacts 1576 across several devices as a common set of contacts.

The mobile computing device 1510 may access cloud-based application programs 1578. Cloud-computing provides application programs (e.g., a word processor or an email program) that are hosted remotely from the mobile computing device 1510, and may be accessed by the device 1510 using a web browser or a dedicated program. Example cloud-based application programs include GOOGLE DOCS word processor and spreadsheet service, GOOGLE GMAIL webmail service, and PICASA picture manager.

Mapping service 1580 can provide the mobile computing device 1510 with street maps, route planning information, and satellite images. An example mapping service is GOOGLE MAPS. The mapping service 1580 may also receive queries and return location-specific results. For example, the mobile computing device 1510 may send an estimated location of the mobile computing device and a user-entered query for "pizza places" to the mapping service 1580. The mapping service 1580 may return a street map with "markers" superimposed on the map that identify geographical locations of nearby "pizza places."

Turn-by-turn service 1582 may provide the mobile computing device 1510 with turn-by-turn directions to a user-supplied destination. For example, the turn-by-turn service 1582 may stream to device 1510 a street-level view of an estimated location of the device, along with data for providing audio commands and superimposing arrows that direct a user of the device 1510 to the destination.

Various forms of streaming media 1584 may be requested by the mobile computing device 1510. For example, computing device 1510 may request a stream for a pre-recorded video file, a live television program, or a live radio program. Example services that provide streaming media include YOUTUBE and PANDORA.

A micro-blogging service 1586 may receive from the mobile computing device 1510 a user-input post that does not identify recipients of the post. The micro-blogging service 1586 may disseminate the post to other members of the micro-blogging service 1586 that agreed to subscribe to the user.

A search engine 1588 may receive user-entered textual or verbal queries from the mobile computing device 1510, determine a set of internet-accessible documents that are responsive to the query, and provide to the device 1510 information to display a list of search results for the responsive documents. In examples where a verbal query is received, the voice recognition service 1572 may translate the received audio into a textual query that is sent to the search engine.

These and other services may be implemented in a server system 1590. A server system may be a combination of hardware and software that provides a service or a set of services. For example, a set of physically separate and networked computerized devices may operate together as a logical server system unit to handle the operations necessary to offer a service to hundreds of individual computing devices.

In various implementations, operations that are performed "in response" to another operation (e.g., a determination or an identification) are not performed if the prior operation is unsuccessful (e.g., if the determination was not performed). Features in this document that are described with conditional language may describe implementations that are optional. In some examples, "transmitting" from a first device to a second device includes the first device placing data into a network for receipt by the second device, but may not include the second device receiving the data. Conversely, "receiving" from a first device may include receiving the data from a network, but may not include the first device transmitting the data.

Figure 16:
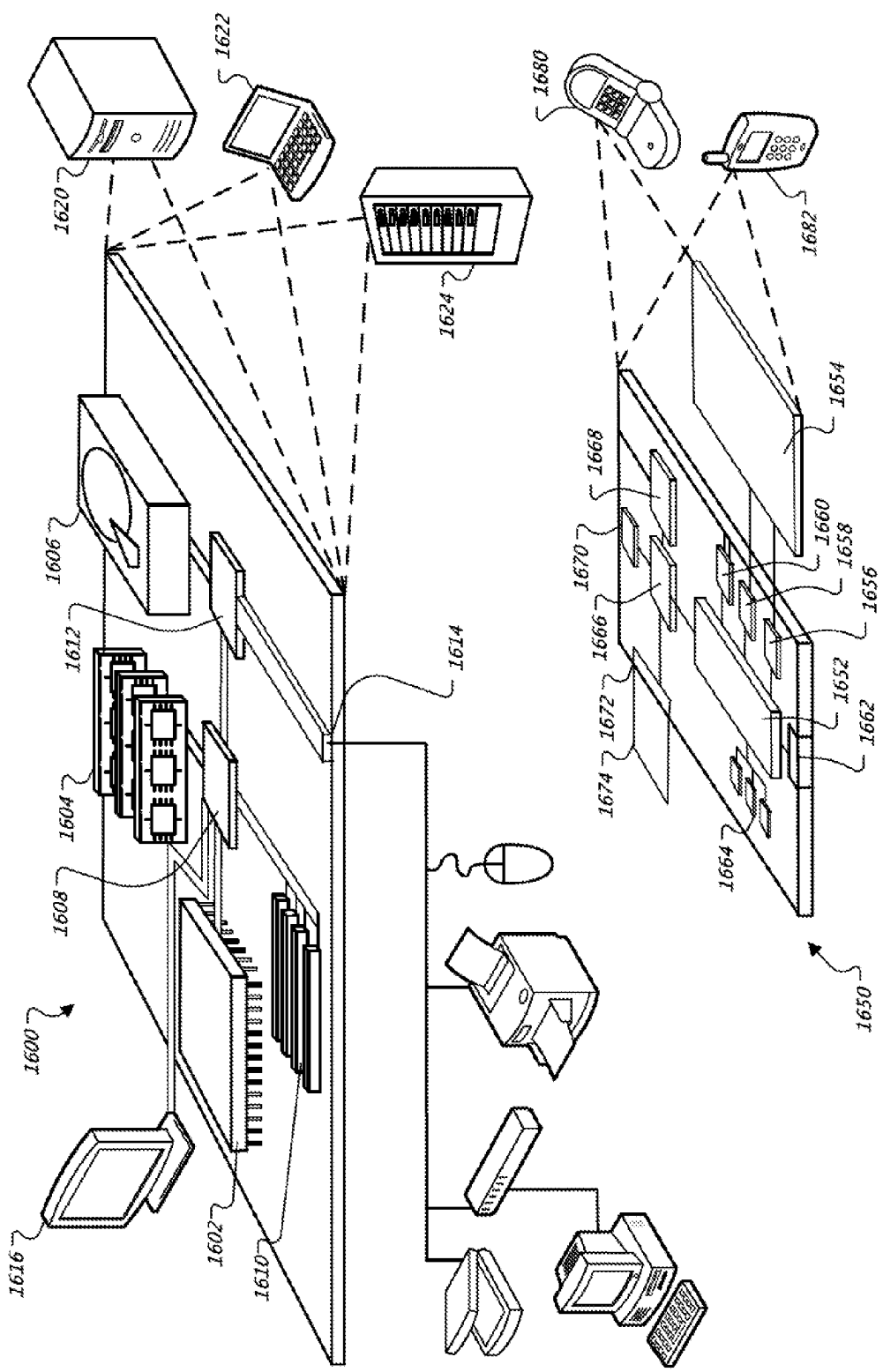
FIG. 16 is a block diagram of computing devices that may be used to implement the systems and methods described in this document, as either a client or as a server or plurality of servers.

FIG. 16 is a block diagram of computing devices 1600, 1650 that may be used to implement the systems and methods described in this document, as either a client or as a server or plurality of servers. Computing device 1600 is intended to represent various forms of digital computers, such as laptops, desktops, workstations, personal digital assistants, servers, blade servers, mainframes, and other appropriate computers. Computing device 1650 is intended to represent various forms of mobile devices, such as personal digital assistants, cellular telephones, smartphones, and other similar computing devices. The components shown here, their connections and relationships, and their functions, are meant to be exemplary only, and are not meant to limit implementations described and/or claimed in this document.

Computing device 1600 includes a processor 1602, memory 1604, a storage device 1606, a high-speed interface 1608 connecting to memory 1604 and high-speed expansion ports 1610, and a low speed interface 1612 connecting to low speed bus 1614 and storage device 1606. Each of the components 1602, 1604, 1606, 1608, 1610, and 1612, are interconnected using various busses, and may be mounted on a common motherboard or in other manners as appropriate. The processor 1602 can process instructions for execution within the computing device 1600, including instructions stored in the memory 1604 or on the storage device 1606 to display graphical information for a GUI on an external input/output device, such as display 1616 coupled to high-speed interface 1608. In other implementations, multiple processors and/or multiple buses may be used, as appropriate, along with multiple memories and types of memory. Also, multiple computing devices 1600 may be connected, with each device providing portions of the necessary operations (e.g., as a server bank, a group of blade servers, or a multi-processor system).

The memory 1604 stores information within the computing device 1600. In one implementation, the memory 1604 is a volatile memory unit or units. In another implementation, the memory 1604 is a non-volatile memory unit or units. The memory 1604 may also be another form of computer-readable medium, such as a magnetic or optical disk.

The storage device 1606 is capable of providing mass storage for the computing device 1600. In one implementation, the storage device 1606 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1604, the storage device 1606, or memory on processor 1602.

The high-speed controller 1608 manages bandwidth-intensive operations for the computing device 1600, while the low speed controller 1612 manages lower bandwidth-intensive operations. Such allocation of functions is exemplary only. In one implementation, the high-speed controller 1608 is coupled to memory 1604, display 1616 (e.g., through a graphics processor or accelerator), and to high-speed expansion ports 1610, which may accept various expansion cards (not shown). In the implementation, low-speed controller 1612 is coupled to storage device 1606 and low-speed expansion port 1614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1600 may be implemented in a number of different forms, as shown in the figure. For example, it may be implemented as a standard server 1620, or multiple times in a group of such servers. It may also be implemented as part of a rack server system 1624. In addition, it may be implemented in a personal computer such as a laptop computer 1622. Alternatively, components from computing device 1600 may be combined with other components in a mobile device (not shown), such as device 1650. Each of such devices may contain one or more of computing device 1600, 1650, and an entire system may be made up of multiple computing devices 1600, 1650 communicating with each other.

Computing device 1650 includes a processor 1652, memory 1664, an input/output device such as a display 1654, a communication interface 1666, and a transceiver 1668, among other components. The device 1650 may also be provided with a storage device, such as a microdrive or other device, to provide additional storage. Each of the components 1650, 1652, 1664, 1654, 1666, and 1668, are interconnected using various buses, and several of the components may be mounted on a common motherboard or in other manners as appropriate.

The processor 1652 can execute instructions within the computing device 1650, including instructions stored in the memory 1664. The processor may be implemented as a chipset of chips that include separate and multiple analog and digital processors. Additionally, the processor may be implemented using any of a number of architectures. For example, the processor 410 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 1650, such as control of user interfaces, applications run by device 1650, and wireless communication by device 1650.

Processor 1652 may communicate with a user through control interface 1658 and display interface 1656 coupled to a display 1654. The display 1654 may be, for example, a TFT (Thin-Film-Transistor Liquid Crystal Display) display or an OLED (Organic Light Emitting Diode) display, or other appropriate display technology. The display interface 1656 may comprise appropriate circuitry for driving the display 1654 to present graphical and other information to a user. The control interface 1658 may receive commands from a user and convert them for submission to the processor 1652. In addition, an external interface 1662 may be provide in communication with processor 1652, so as to enable near area communication of device 1650 with other devices. External interface 1662 may provided, for example, for wired communication in some implementations, or for wireless communication in other implementations, and multiple interfaces may also be used.

The memory 1664 stores information within the computing device 1650. The memory 1664 can be implemented as one or more of a computer-readable medium or media, a volatile memory unit or units, or a non-volatile memory unit or units. Expansion memory 1674 may also be provided and connected to device 1650 through expansion interface 1672, which may include, for example, a SIMM (Single In Line Memory Module) card interface. Such expansion memory 1674 may provide extra storage space for device 1650, or may also store applications or other information for device 1650. Specifically, expansion memory 1674 may include instructions to carry out or supplement the processes described above, and may include secure information also. Thus, for example, expansion memory 1674 may be provide as a security module for device 1650, and may be programmed with instructions that permit secure use of device 1650. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1664, expansion memory 1674, or memory on processor 1652 that may be received, for example, over transceiver 1668 or external interface 1662.

Device 1650 may communicate wirelessly through communication interface 1666, which may include digital signal processing circuitry where necessary. Communication interface 1666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1668. In addition, short-range communication may occur, such as using a Bluetooth, WiFi, or other such transceiver (not shown). In addition, GPS (Global Positioning System) receiver module 1670 may provide additional navigation- and location-related wireless data to device 1650, which may be used as appropriate by applications running on device 1650.

Device 1650 may also communicate audibly using audio codec 1660, which may receive spoken information from a user and convert it to usable digital information. Audio codec 1660 may likewise generate audible sound for a user, such as through a speaker, e.g., in a handset of device 1650. Such sound may include sound from voice telephone calls, may include recorded sound (e.g., voice messages, music files, etc.) and may also include sound generated by applications operating on device 1650.

The computing device 1650 may be implemented in a number of different forms, as shown in the figure. For example, it may be implemented as a cellular telephone 1680. It may also be implemented as part of a smartphone 1682, personal digital assistant, or other similar mobile device.

Additionally computing device 1600 or 1650 can include Universal Serial Bus (USB) flash drives. The USB flash drives may store operating systems and other applications. The USB flash drives can include input/output components, such as a wireless transmitter or USB connector that may be inserted into a USB port of another computing device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. Moreover, other mechanisms for performing the systems and methods described in this document may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A computer-implemented method, comprising:
presenting, by a computing system, graphical content on a display device;
tracking, by the computing system, a visible physical feature of a user of the computing system through a plurality of images that are captured by a camera of the computing system, and determining a first size of the visible physical feature of the user in a first image and a second size of the visible physical feature of the user in a second image;
using, by the computing system, the determined first size of the visible physical feature and the determined second size of the visible physical feature to determine, by the computing system, a first change in a distance between the user and the camera;
as a result of identifying that the first change in the distance between the user and the camera is a decrease in the distance, adding visible annotations to the graphical content without changing boundaries of a displayed region of the graphical content;
determining, by the computing system, that the user has physically contacted a user input device of the computing system;
modifying, by the computing system, the boundaries of the displayed region of the graphical content based on the determined physical contact with the user input device;
presenting, by the computing system, the graphical content for display by the display device with the visible annotations added and the boundaries modified, wherein the physical contact and the first change in the distance between the user and the camera are determined to occur simultaneously, and wherein presenting the graphical content with the visible annotations added and the boundaries modified includes presenting the graphical content with the visible annotations added and the boundaries modified during the simultaneous occurrence of the physical contact and the change in the distance;
tracking, by the computing system, the visible physical feature of the user through the plurality of images, and determining a third size of the visible physical feature of the user in a third image and a fourth size of the visible physical feature of the user in a fourth image;
using, by the computing system, the determined third size of the visible physical feature and the determined fourth size of the visible physical feature to determine, by the computing system, a second change in the distance between the user and the camera; and
as a result of identifying that the second change in the distance between the user and the camera is an increase in the distance, removing second visible annotations from the graphical content such that the graphical content no longer includes representations of the second visible annotations.

2. The computer-implemented method of claim 1, wherein the visible physical feature of the user is a head of the user or a part of the head of the user.

3. The computer-implemented method of claim 1, wherein the display device and the user input device comprise a touchscreen display device.

4. The computer-implemented method of claim 3, wherein:
determining that the user has physically contacted the user input device includes determining that a lateral movement of the physical contact has moved in a direction across a surface of the touchscreen display device; and modifying the boundaries of the displayed region of the graphical content includes panning the displayed region of the graphical content in the direction.

5. The computer-implemented method of claim 3, wherein:
determining that the user has physically contacted the user input device includes determining that a first physical user contact with the touchscreen has moved closer to a second physical user contact with the touchscreen; and
modifying the boundaries of the displayed region of the graphical content includes zooming away from the displayed region so that the displayed region decreases in scale.

6. The computer-implemented method of claim 1, wherein other visible annotations are not removed from the graphical content as the visible annotations are added.

7. The computer-implemented method of claim 1, wherein modifying the boundaries of the displayed region of the graphical content does not account for the determined change in the distance between the user and the camera.

8. The computer-implemented method of claim 1, wherein:
the graphical content includes a map that shows geographical features of the world,
adding the visible annotations to the graphical content includes adding visible annotations to the map, the visible annotations selected from a group consisting of street names and business names,
removing the second visible annotations from the graphical content includes removing the annotations that were added to the map, and
modifying the boundaries of the displayed region of the graphical content includes changing, in response to determining that the user physically contacted the user input device, a region of the map that is displayed by the display device by zooming into the map so that the map increases in scale or zooming away from the map so that the map decreases in scale.

9. The computer-implemented method of claim 1, wherein:
the graphical content includes a display of an object that the computing system presents for display as being currently displayed content from among a set of objects;
adding the visible annotations to the graphical content includes adding visible annotations to the display of the object that is the currently displayed content as the distance between the user and the camera is determined to decrease; and
modifying the boundaries of the displayed region of the graphical content includes changing the currently displayed content from the object that is the currently displayed content to a different object in response to determining that the user physically contact the user input device.

10. The computer-implemented method of claim 1, wherein the visible physical feature of the user comprises the user's head.

11. The computer-implemented method of claim 1, wherein the display device did not present representations of the visible annotations before the visible annotations were added to the graphical content.

12. A computer-implemented method, comprising:
presenting, by a computing system and on a touchscreen, a display of a region of a map that shows geographical features of the world;
tracking, by the computing system, a visible physical feature of a user of the computing system through a plurality of images that are captured by a camera of the computing system, and determining a first size of the visible physical feature of the user in a first image and a second size of the visible physical feature of the user in a second image;
using, by the computing system, the determined first size of the visible physical feature and the determined second size of the visible physical feature to determine, by the computing system, a first change in a distance between the user and the camera;
as a result of identifying that the first change in the distance between the user and the camera is a decrease in the distance, increasing a level of detail of the displayed region of the map without changing boundaries of the displayed region of the map;
recognizing, by the computing system, touch input with a surface of the touchscreen;
modifying, by the computing system, the map to include the added detail based on the identified decrease in the distance, and to change the boundaries of the displayed region of the map to zoom in to the map so that the map increases in scale or zoom away from the map so that the map decreases in scale based on the recognized touch input, wherein the first change in the distance and the touch input occur simultaneously;
presenting, by the computing system, the modified map for display by the display device;
tracking, by the computing system, the visible physical feature of the user through the plurality of images, and determining a third size of the visible physical feature of the user in a third image and a fourth size of the visible physical feature of the user in a fourth image;
using, by the computing system, the determined third size of the visible physical feature and the determined fourth size of the visible physical feature to determine a second change in the distance between the user and the camera; and
as a result of determining that the second change in the distance between the user and the camera is an increase in the distance, decreasing the level of detail of the displayed region of the map.

13. The computer-implemented method of claim 12, wherein:
increasing the level of detail of the displayed region of the map based on the first change in the distance between the user and the camera includes adding street name or business name visible annotations to the map; and
decreasing the level of detail of the displayed region of the map based on the second change in the distance between the user and the camera includes removing the street name or the business name visible annotations from the map.

14. The computer-implemented method of claim 12, wherein:
increasing the level of detail of the displayed region of the map based on the first change in the distance between the user and the camera includes at least partially transforming the map from showing a road map that illustrates roads of an associated geographical area to showing a photographical image of the associated geographical image; and
decreasing the level of detail of the displayed region of the map based on the second change in the distance between the user and the camera includes at least partially transforming the map from showing the photographical image of the associated geographical area to showing the road map.

15. The computer-implemented method of claim 12, wherein:
increasing the level of detail of the displayed region of the map based on the first change in the distance between the user and the camera includes at least partially transforming the map from showing a two-dimensional representation of an associated geographical area to showing a three-dimensional representation of the associated geographical area; and
decreasing the level of detail of the displayed region of the map based on the second change in the distance between the user and the camera includes at least partially transforming the map from showing the three-dimensional representation of the associated geographical area to showing the two-dimensional representation of the associated geographical area.

16. The computer-implemented method of claim 15, further comprising determining, by the computing system, a change in location of the user with respect to the camera by tracking the visible physical feature of the user, and in response, changing a displayed point of view of the three-dimensional representation of the associated geographical area.

17. The computer-implemented method of claim 12, wherein the visible physical feature of the user comprises the user's head.

18. A computerized system, comprising:
a touchscreen for displaying graphical content;
a camera arranged to capture images;
a first computing subsystem that is configured to identify touch input with the touchscreen display device and, in response, to modify boundaries of a region of the graphical content that is displayed by the touchscreen; and
a second computing subsystem that is configured to identify a change in distance between a feature of a user and the camera and, in response, to modify a level of detail of the graphical content that is displayed by the touchscreen, wherein the second computing subsystem is configured to increase the level of detail of the graphical content in response to the distance decreasing, and to decrease the level of detail of the graphical content in response to the distance increasing, wherein the second computing subsystem is configured to maintain the displayed region of graphical content without a change in the boundaries of the region of the graphical content as the level of detail is increased or decreased in response to the change in the distance, wherein the computing system is configured such that the touch input and the change in distance can occur simultaneously.

19. The computerized system of claim 18, wherein the first computing subsystem is configured to pan the region of the graphical content that is displayed on the touchscreen in a first direction in response to the touch input performing a lateral movement across the touchscreen in the first direction.

20. The computerized system of claim 18, wherein the first computing subsystem is configured to zoom into the graphical content that is displayed on the touchscreen so as to display the graphical content at a greater scale in response to the touch input including a first touch input and a second touch input that are performing as lateral movements across the touchscreen away from each other.

21. The computerized system of claim 18, wherein the computerized system is programmed to determine whether the touch input and the change in distance between the feature of the user and the camera occur simultaneously.

22. The computerized system of claim 18, wherein:
the region of the graphical content includes a geographical map; and
the level of details includes street names or business names and a quantity of the street names or the business names that are displayed by the touchscreen increases in response to the distance decreasing and decreases in response to the distance increasing.

23. The computer-implemented method of claim 18, wherein computerized system is programmed to identify the change in the distance between the feature of the user and the camera by identifying that a size of the user's head changes in a series of images captured by the camera.

24. A computer-implemented method, comprising:
presenting, by a computing system and on a touchscreen, a display of a region of a map that shows geographical features of the world;
tracking, by the computing system, a head of a user of the computing system through a plurality of images that are captured by a camera of the computing system, and determining a first size of the head of the user in a first image and a second size of the head of the user in a second image;
using, by the computing system, the determined first size of the head and the determined second size of the head to determine, by the computing system, a first change in a distance between the user and the camera;
as a result of identifying that the first change in the distance between the user and the camera is a decrease in the distance, adding street names or business names to the displayed region of the map, the street names and business names not previously having been displayed by the computing system in the region of the map, without zooming into the region of the map as a result of identifying that the first change in the distance is a decrease in the distance;
recognizing, by the computing system, touch input with a surface of the touchscreen that occurs simultaneous with the camera capturing the first image and the second image;
changing, by the computing system and based on the recognized touch input, the boundaries of the displayed region of the map to zoom in to the map so that the map increases in scale or zoom away from the map so that the map decreases in scale;
presenting, by the computing system, the region of the map that includes the added street names or business names, and that has the changed boundaries;
tracking, by the computing system, the head of the user through the plurality of images, and determining a third size of the head of the user in a third image and a fourth size of the head of the user in a fourth image;
using, by the computing system, the determined third size of the head and the determined fourth size of the head to determine, by the computing system, a second change in distance between the user and the camera; and
as a result of identifying that the second change in the distance between the user and the camera is an increase in the distance, removing the street names or the business names from the region of the map so that the region of the map no longer includes representations of the street names or the business names, without zooming out from the region of the map as a result of identifying that the second change in the distance is an increase in the distance.

* * * * *

UNITED STATES PATENT AND TRADEMARK OFFICE
CERTIFICATE OF CORRECTION

PATENT NO. : 8,368,723 B1
APPLICATION NO. : 13/274045
DATED : February 5, 2013
INVENTOR(S) : Richard C. Gossweiler, III Page 1 of 1

It is certified that error appears in the above-identified patent and that said Letters Patent is hereby corrected as shown below:

IN THE CLAIMS:

Column 40, in Claim 23, Lines 1 and 2: Replace "The computer-implemented method of claim 18, wherein computerized system" with -- The computerized system of claim 18, wherein the computerized system --.

Signed and Sealed this
Ninth Day of April, 2013

Teresa Stanek Rea
*Acting Director of the United States Patent and Trademark Office*

UNITED STATES PATENT AND TRADEMARK OFFICE
CERTIFICATE OF CORRECTION

PATENT NO. : 8,368,723 B1  
APPLICATION NO. : 13/274045  
DATED : February 5, 2013  
INVENTOR(S) : Richard C. Gossweiler, III It is certified that error appears in the above-identified patent and that said Letters Patent is hereby corrected as shown below:

IN THE CLAIMS:

Column 40, lines 9 and 10 (Claim 23, Lines 1 and 2) Replace "The computer-implemented method of claim 18, wherein computerized system" with -- The computerized system of claim 18, wherein the computerized system --.

This certificate supersedes the Certificate of Correction issued April 9, 2013.

Signed and Sealed this
Thirtieth Day of April, 2013

Teresa Stanek Rea
*Acting Director of the United States Patent and Trademark Office*